US005483357A

United States Patent [19]

Nagano

[11] Patent Number: 5,483,357
[45] Date of Patent: Jan. 9, 1996

[54] IMAGE SCANNING DEVICE

[75] Inventor: Fumikazu Nagano, Yamato-Koriyama, Japan

[73] Assignee: Sharp Kabushiki Kaisha, Osaka, Japan

[21] Appl. No.: 233,848

[22] Filed: Apr. 26, 1994

[30] Foreign Application Priority Data

Apr. 27, 1993 [JP] Japan .................. 5-101398
Jun. 24, 1993 [JP] Japan .................. 5-153744

[51] Int. Cl.⁶ ................................. H04N 1/04
[52] U.S. Cl. ............... 358/483; 358/443; 358/447
[58] Field of Search ................. 358/483, 482, 358/443, 410, 409, 475, 445, 446, 447, 513, 514, 474, 477; 348/241, 312, 901; 250/208.1, 252.1, 458.1, 235

[56] References Cited

U.S. PATENT DOCUMENTS

| | | | |
|---|---|---|---|
| 3,977,784 | 8/1976 | Hara | 355/67 |
| 4,514,626 | 4/1985 | Tateoka et al. | 358/482 |
| 4,831,444 | 5/1989 | Kato | 348/518 |
| 4,855,930 | 8/1989 | Chao et al. | 250/458.1 |
| 4,953,038 | 8/1990 | Schiebel et al. | 358/483 |
| 5,077,810 | 12/1991 | D'Luna | 358/443 |
| 5,157,515 | 10/1992 | Hasegawa | 358/412 |
| 5,187,595 | 2/1993 | Kitani et al. | 358/475 |
| 5,187,596 | 2/1993 | Hwang | 358/483 |
| 5,255,171 | 10/1993 | Clark | 355/70 |
| 5,258,931 | 11/1993 | Hassler, Jr. | 250/252.1 |
| 5,313,289 | 5/1994 | Nagane | 358/475 |

FOREIGN PATENT DOCUMENTS

| | | |
|---|---|---|
| 0454292 | 10/1991 | European Pat. Off. . |
| 52-155984 | 12/1977 | Japan . |
| WO92/01995 | 2/1992 | WIPO . |

OTHER PUBLICATIONS

Suwa Seikosha, Patent Abstracts of Japan, vol. 9, No. 79 (P–347) Apr. 9, 1985.
IBM Technical Disclosure Bulletin, vol. 36, No. 1, Jan. 31, 1993, Armonk, pp. 143–143, Anonymous "Cylindrical Integrating Cavity as Illumination For Scanners".

*Primary Examiner*—Edward L. Coles, Sr.
*Assistant Examiner*—Fan Lee
*Attorney, Agent, or Firm*—David G. Conlin; Kevin J. Fournier

[57] ABSTRACT

An image scanning device has a light source for emitting a beam, a CCD circuit board having a CCD sensor, an optical unit for guiding the emitted beam from the light source to the CCD sensor, a CCD sensor driving circuit connected with the CCD circuit board with a signal cable, a clock generating circuit for generating a clock to be transferred to the CCD sensor, a reset pulse generating circuit for generating a reset pulse for resetting an output buffer of the CCD sensor, a clamp circuit for clamping an output of the CCD sensor, and an analog-to-digital converter for converting an analog signal into a digital signal. The clock generating circuit is disposed on the CCD circuit board.

2 Claims, 23 Drawing Sheets

READING LINE
12
23
13 n = 1.3
n = 1.0
BEAM C
BEAM B
BEAM A

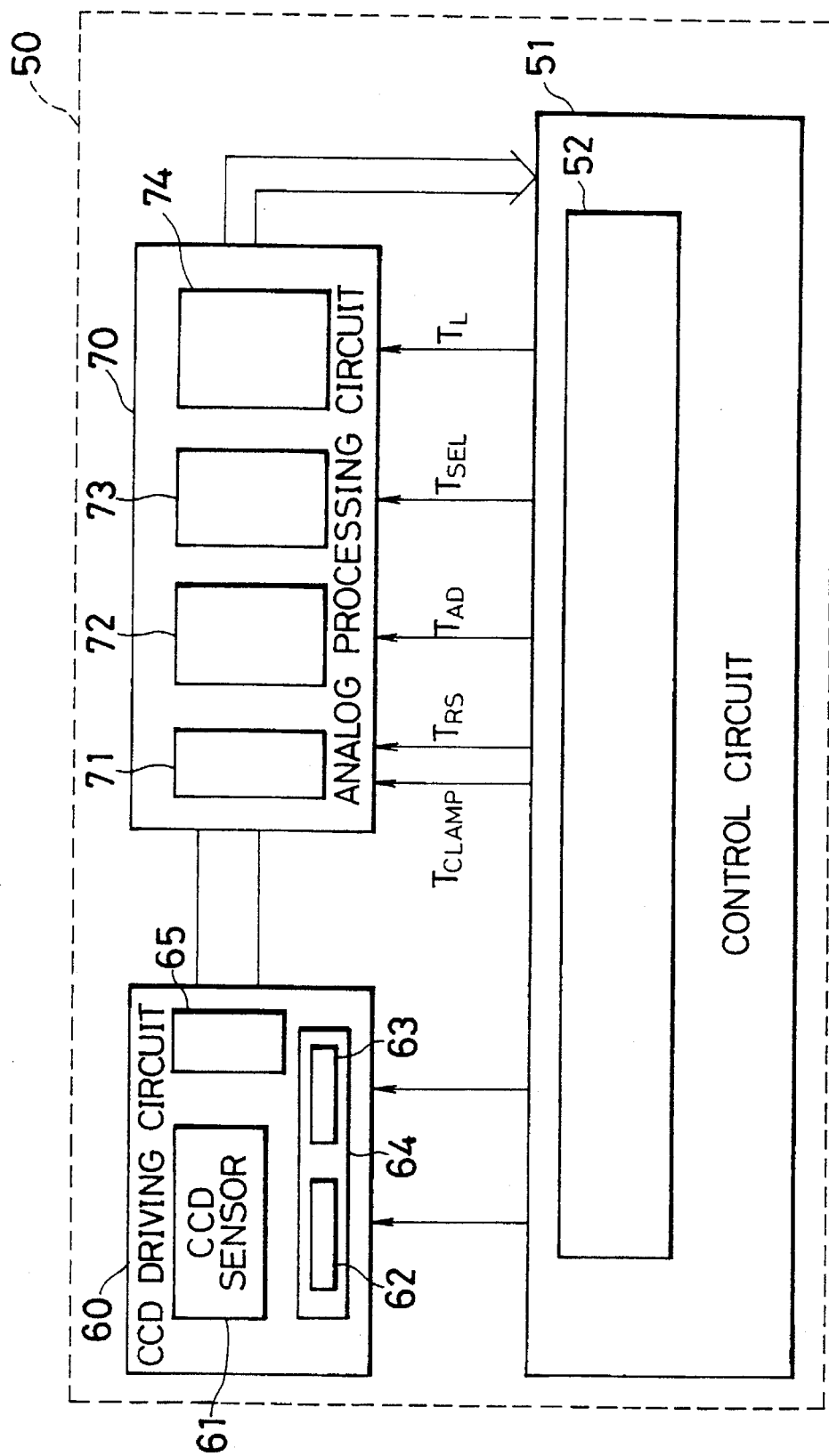

IMAGE SCANNING DEVICE

BACKGROUND OF THE INVENTION

1. Field of the Invention

The present invention relates to an image scanning device arranged to use a one-dimensional CCD sensor.

2. Description of the Related Art

Recently, an image scanning device has been widely used as means for inputting a text or a graphic data to a computer or inputting a data to a digital copier or a facsimile.

The image scanning device is arranged to apply an intense beam from a light source to a manuscript surface to be read and to form on an image sensor the beam reflected from the manuscript surface as an image through the effect of an optical system. The image sensor operates to photoelectrically convert the reflected beam into a voltage level proportional to intensity of the reflected beam, concretely, tone of the manuscript in a pixel-by-pixel manner for reading an image. The read analog signal is amplified and converted into a digital signal through the effect of an analog-to-digital converter. Then, the converted digital signal is transferred to the system.

The image sensor, in general, is a one-dimensional CCD sensor having pixels arranged on one line.

FIG. 15 is a general schematic view showing a scanning device.

A scanning device 10 comprises a glass table 12 on which a manuscript sheet 11 is to be placed, a light source 13 located under the glass table 12, an optical unit 14 having a mounting board 15 for mounting a CCD sensor 20, a mounting board 16 for mounting an analog processing circuit and a control circuit, a signal cable 21 connecting both of the mounting boards 15 and 16 with each other, and a cabinet 22. The optical unit 14 is provided with a mirror 18, a lens 19, a CCD sensor (CCD element) 20, and the mounting board 15. In addition, a numeral 17 denotes a pulse motor for moving the optical unit 14. The light source 13 performs a way of condensing light as shown in FIG. 16.

In FIGS. 15 and 16, during the scan, the beam emitted from the light source 13 passes through the glass table 12 to a manuscript sheet 11. The beam reflected on the manuscript sheet 11, again, passes through the glass table 12 and then is reflected on the mirror 18. The beam reflected on the mirror 18 is condensed through the lens 19 and then is applied to a light-receptacle surface of the CCD sensor 20.

FIG. 17 is a block diagram showing the CCD sensor used in the scanning device. $S_1, S_2, \ldots, S_N$ denote photodiodes, each serving as a light receptor. $AS_1, AS_2, \ldots, AS_N$ each denote an analog shift register (CCD) for shifting out an analog output of the light receptor. TGATE denotes a transfer gate for transferring an analog output of the light receptor to the analog shift register. OB denotes an output buffer. $\phi_T$ denotes a transfer pulse. $\phi_1$ and $\phi_2$ denote transfer clocks to the shift register. $\phi_R$ denotes a reset clock. VOUT denotes a CCD output.

The voltages generated in the light receptors $S_1, S_2, \ldots, S_N$ are transferred to the analog shift register in synchronous to the transfer pulse $\phi_T$. The resister operates to sequentially shift data in synchronous to the transfer clocks $\phi_1$ and $\phi_2$ and output the data for each one pixel at an output terminal of the shift register.

The output from the shift register is fed to an output buffer OB. The reset pulse $\phi_R$ is applied to the output buffer OB at each of the light receptors contained in the CCD.

The output VOUT from the output buffer OB is picked out as an output of the CCD sensor.

The black level of the output VOUT of the CCD sensor normally keeps an electric potential of about 3 to 6 V in the floating state. To keep the black level at a constant potential, a clamp circuit is used.

FIG. 18 is a block diagram showing a CCD sensor having two output channels. In FIG. 18, $S_1, S_2, \ldots, S_{2n}$ each denote a light receptor. $OSR_1, OSR_2, \ldots, OSR_n$ denote odd shift registers for shifting out the analog outputs of the light receptors located in odd rows. OTG denotes an a transfer sate for transferring the analog outputs of the light receptors located in odd rows to the shift registers ranged in odd rows. $ESR_1, ESR_2, \ldots, ESR_n$ denote shift registers ranged in even rows, for shifting out the analog outputs of the light receptors located in even rows. ETG denotes a transfer gate for transferring the analog outputs of the light receptors ranged in even rows to the shift registers located in even rows. OBUF denotes a buffer amplifier for odd rows. EBUFF denotes a buffer amplifier for even rows. SH denotes a start pulse for starting a shift operation of the shift register. $\phi_{1O}$, $\phi_{2O}$, $\phi_{1E}$ and $\phi_{2E}$ denote transfer pulses. $\phi_{RO}$ and $\phi_{RE}$ denote reset pulses. OCCDOUT denotes a CCD output of the light receptors on the column side. ECCDOUT denotes a CCD output of the light receptors on the even side. As an example, if n is set as n=1024, the resulting CCD sensor has 2048 elements.

Further, FIG. 19 is a block diagram showing a conventional scanning device. In FIG. 19, a numeral 60 denotes a CCD driving circuit. The output of the CCD driving circuit 60 is connected to an input of the buffer 78 through a level-shift capacitor 80. The input of the buffer 78 is connected to a 5-volt power supply through a clamping transistor 81. The output of the buffer 78 is connected to an input of an analog-to-digital converter 75. The black level of the CCD output is fixed at 5 volts through the effect of the level-shift capacitor 80 and the clamping analog switch 81.

A numeral 51 denotes a control circuit for outputting various control clocks $\phi_T$, $\phi_1$, $\phi_2$, $\phi_R$, $T_{CLAMP}$, and $T_{AD}$. The clocks $\phi_T$, $\phi_1$, $\phi_2$ and $\phi_R$ are applied to the CCD driving circuit 60. The clock $T_{CLAMP}$ is applied to the transistor 81. The clock $T_{AD}$ is applied to an analog-to-digital converter 75.

In turn, the description will be oriented to the operation of the conventional scanning device. FIG. 20 shows several timings for signals, concretely, the driving signals $\phi_T$, $\phi_1$, $\phi_R$, the CCD output signal VOUT, the clamp signal $T_{CLAMP}$, the buffer output VO, and the driving signal $T_{AD}$ for an analog-to-digital converter. The VOUT output of the CCD driving circuit 60 is clamped at 5 volts through the effect of the capacitor 80 and the transistor 81. The clamped signal is amplified by the buffer 78 and then is outputted as a signal VO. The signal VO is converted into a digital signal DOUT through the effect of the analog-to-digital converter 75.

In FIG. 19, the analog-to-digital converter 75 may be assumed as a 8-bit converter. If the signal VO=+5 volts, the output DOUT (DOUT0, DOUT1, ..., DOUT7) is;

$$DOUT = \sum_{k=0}^{7} DOUT_K 2^K = 0$$

That is, $DOUT_K = 0$ (K=0, 1, ..., 7)

If the signal VO=0 volt, the output DOUT is;

$$DOUT = \sum_{k=0}^{7} DOUT_K 2^K = 255$$

That is, $$DOUT_K = 1 \ (K = 0, 1, \ldots, 7)$$

The analog-to-digital converter 75 operates to convert the analog buffer output VO into a digital signal at the leading edge of the clock $T_{AD}$ and then transfer the digital output DOUT to the host computer. The host computer reads the digital output DOUT at the trailing edge of the clock $T_{AD}$.

In FIGS. 15 and 19, the signals $\phi_{1O}$ and $\phi_{1E}$ for driving the driving circuit 60 are generated from the signal $\phi_1$. The signals $\phi_{2O}$ and $\phi_{2E}$ are generated from the signal $\phi_2$. The transfer clock signals $\phi_1$ and $\phi_2$ are generated by the analog processing circuit 70 and the control circuit 51 and then fed to the CCD driving circuit through the signal cable 21. Thus, the signal is excessively delayed. If the long signal cable is used, the phases of the signals $\phi_1$ and $\phi_2$ are shifted on the long transfer way, thereby worsening the transfer efficiency of charges contained in the CCD sensor. FIG. 21a shows the phase-shifted signal waveform. FIG. 21b shows the signal waveform keeping a proper phase.

The reset pulses $\phi_{RO}$ and $\phi_{RE}$ to be sent to the CCD driving circuit are generated from the reset pulse $\phi_R$. The reset pulse $\phi_R$ is produced by the analog processing circuit 70 and the control circuit 51 and is fed to the CCD driving circuit 60 through the signal cable 21.

The reset pulse $\phi_R$ made of fast clocks is adversely effected by the radio wave generated in the signal cable 21.

Moreover, when $\phi_R$ is being sent on a long transmission way, the time relation between $\phi_1$ and $\phi_2$ may be variable.

A reverse signal of $\psi_0$ from which $\phi_1$ and $\phi_2$ are generated brings about radio wave noises in the signal cable.

If the CCD sensors are provided on the two channels for odd and even outputs for executing the fast processing, the outputs on the odd and the even sides from the CCD elements are independently converted into the digital signals through the corresponding analog-to-digital converters. Since, however, the analog-to-digital converters have their own analog-to-digital converting characteristics, it results in disadvantageously making periodic stripes in the signals.

The foregoing disadvantages inhibit to drive the CCD sensor at most several MHz.

Further, as shown in FIG. 16, the beam from the light source is widely dispersed with the reading line as a center. As such, the use part of the beam is quite small, which results in disadvantageously worsening the image quality.

The time consumed for one period of the buffer output VO is calculated with reference to FIG. 22. The time is 400 nsec. This is because

- a width t1 of the reset signal $\phi_R$ normally needs as long as 50 nsec,
- a time t2 from the tail of the reset signal $\phi_R$ to the trailing edge of the clamp signal $T_{CLAMP}$ needs at least an interval of 50 nsec,
- a width t3 of the clamp signal $T_{CLAMP}$ needs at least 50 nsec or longer,
- a time t4 from the tail of the clamp signal $T_{CLAMP}$ to the start of the signal component of the buffer output VO needs at least an interval of 50 nsec, and
- a time width t5 from when the signal component of the buffer output VO is settled down to when the signal component to be converted from an analog to a digital signal is obtained needs an interval of 200 nsec.

Hence, the time required for one period of the buffer output VO is;

$$t1+t2+t3+t4+t5=400 \text{ nsec}$$

That is, the time for one period needs twice as long as a time width t5 of the signal component. This is because the signal is reset and clamped at each one CCD output. This limits a reading speed of the scanning device arranged to use the CCD sensor, thereby making it impossible to do fast scanning.

SUMMARY OF THE INVENTION

It is a first object of the present invention to provide a scanning device which enables to drive at 10 MHz or more so that the device may operate at fast speed.

It is a second object of the present invention to provide a scanning device which is capable of outputting an image at fast speed.

It is a third object of the present invention to provide a scanning device which is capable of obtaining a low-level output and quickly outputting an image.

It is a fourth object of the present invention to provide a scanning device which is arranged to efficiently condense a beam from a light source substantially on a reading line for offering an excellent image quality.

According to a first aspect of the invention, an image scanning device comprises:

a light source for emitting a beam;

a CCD circuit board having a CCD sensor;

an optical unit for guiding the emitted beam from the light source to the CCD sensor;

a CCD sensor driving circuit connected with the CCD circuit board with a signal cable;

a clock generating circuit for generating a clock to be transferred to the CCD sensor;

a reset pulse generating circuit for generating a reset pulse for resetting an output buffer of the CCD sensor;

a clamp circuit for clamping an output of the CCD sensor; and an analog-to-digital converter for converting an analog signal into a digital signal, wherein the clock generating circuit is disposed on the CCD circuit board.

In the arrangement according to the first aspect of the invention, a circuit is provided for generating clock signals to be transferred to the CCD sensor. Hence, no phase shift takes place between the clock signals. Further, no radio wave noise caused by the signal line is brought about, so that the scanning device may operate at fast speed.

According to a second aspect of the invention, an image scanning device comprises:

a light source for emitting a beam;

a CCD circuit board having a CCD sensor;

an optical unit for guiding the emitted beam from the light source to the CCD sensor;

a CCD sensor driving circuit connected with the CCD circuit board with a signal cable;

a clock generating circuit for generating clocks to be transferred to the CCD sensor;

a reset pulse generating circuit for generating a reset pulse for resetting an output buffer of the CCD sensor;

a clamp circuit for clamping an output of the CCD sensor; and an analog-to-digital converter for converting an analog signal into a digital signal, wherein the reset pulse generating circuit is disposed on the CCD circuit board.

In the arrangement according to the second aspect of the invention, the circuit for generating reset signals for the CCD sensor are provided on the mounting board for the CCD sensor. Hence, no phase shift takes place between the clock signals. Further, no radio wave noise caused by the signal line is brought about, so that the scanning device may operate at fast speed.

According to a third aspect of the invention, an image scanning device comprises:

a light source for emitting a beam;

a CCD circuit board having a CCD sensor;

an optical unit for guiding the emitted beam from the light source to the CCD sensor;

a CCD sensor driving circuit connected with the CCD circuit board with a signal cable;

a clock generating circuit for generating clocks to be transferred to the CCD sensor;

a reset pulse generating circuit for generating a reset pulse for resetting an output buffer of the CCD sensor;

a clamp circuit for clamping an output of the CCD sensor; and an analog-to-digital converter for converting an analog signal into a digital signal, wherein the CCD sensor driving circuit comprises a fast clock generator for feeding clocks to a CCD element at fast speed and a voltage attenuator for attenuating a voltage of the fast clocks.

In the arrangement according to the third aspect of the invention, the CCD sensor driving circuit comprises a fast clock generator for feeding clocks to a CCD element at fast speed and a voltage attenuator for attenuating a voltage of the fast clocks. Hence, no phase shift takes place between the clock signals. Further, no radio wave noise caused by the signal line is brought about, so that the scanning device may operate at fast speed.

According to the fourth aspect to the invention, an image scanning device comprises:

a light source for emitting a beam;

a CCD circuit board having a CCD sensor;

an optical unit for guiding the emitted beam from the light source to the CCD sensor;

a CCD sensor driving circuit connected with the CCD circuit board with a signal cable;

a clock generating circuit for generating a clock to be transferred to the CCD sensor;

a reset pulse generating circuit for generating a reset pulse for resetting an output buffer of the CCD sensor;

a clamp circuit for clamping an output of the CCD sensor; and an analog-to-digital converter for converting an analog signal into a digital signal, wherein the optical unit includes a light condensing circuit for condensing the beam emitted from the light source to a front point of the light source, the light source irradiating the beam on a manuscript surface.

In the arrangement according to the fourth aspect of the invention, the beam from the light source is allowed to be efficiently condensed on the reading line, thereby making it possible to obtain an excellent image quality.

According to a fifth aspect to the invention an image scanning device comprising:

a light source for emitting a beam;

a CCD circuit board having a CCD sensor;

an optical unit for guiding the emitted beam from the light source to the CCD sensor;

a CCD sensor driving circuit connected with the CCD circuit board with a signal cable;

a clock generating circuit for generating a clock to be transferred to the CCD sensor;

a reset pulse generating circuit for generating a reset pulse for resetting an output buffer of the CCD sensor;

a clamp circuit for clamping an output of the CCD sensor;

an analog-to-digital converter for converting an analog signal into a digital signal;

an actuating circuit for actuating the reset means and the clamp circuit one time for a plurality of outputs of the CCD sensor;

a first latch circuit for latching an output of the analog-to-digital converter;

a second latch circuit for latching for latching an output of the first latch circuit; and a subtracting for subtracting the output of the second latch circuit from the output of the first latch circuit.

In the arrangement according to the fifth aspect of the invention, the output of the second latch is subtracted from the output of the first latch so as to obtain a true output value from the CCD sensor. As such, the scanning device enables to offer a low-level output and quickly output an image.

Further objects and advantages of the present invention will be apparent from the following description of the preferred embodiments of the invention as illustrated in the accompanying drawings.

BRIEF DESCRIPTION OF THE DRAWINGS

FIGS. 4a and 4b are block diagrams showing a sensing circuit according to the present invention;

FIG. 9 shows an output circuit;

DESCRIPTION OF THE PREFERRED EMBODIMENTS

Figure 1:
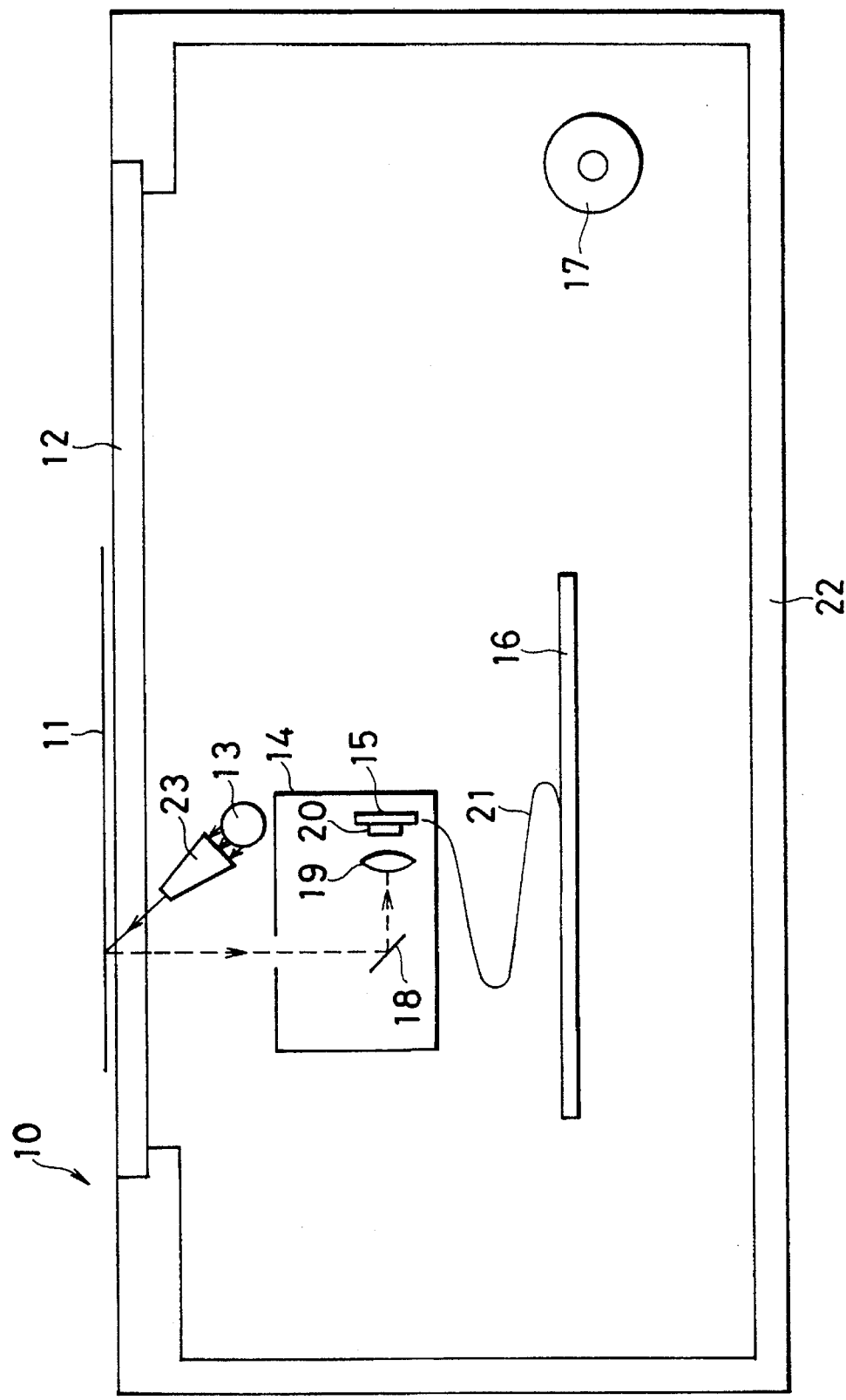
FIG. 1 is a schematic view showing a scanning device according to the present invention.

FIG. 1 is a schematic view showing a scanning device according to an embodiment of the present invention.

In FIG. 1, the scanning device 10 comprises a glass table 12 on which a manuscript sheet 11 is to be placed, a light source 13 located under the glass table 12, an optical unit 14 having a mounting board 15 for mounting a CCD sensor 20, and a mounting board 16. A numeral 17 denotes a pulse motor for moving the optical unit 14.

The optical unit 14 is provided with a mirror 18, a lens 19, a CCD sensor 20 and a circuit board 15 on which the CCD sensor is mounted.

The circuit board 16 has a control circuit and an analog processing circuit (to be discussed later) mounted thereon. A numeral 21 denotes a signal line for connecting these mounting boards 15 and 16.

Figure 15:
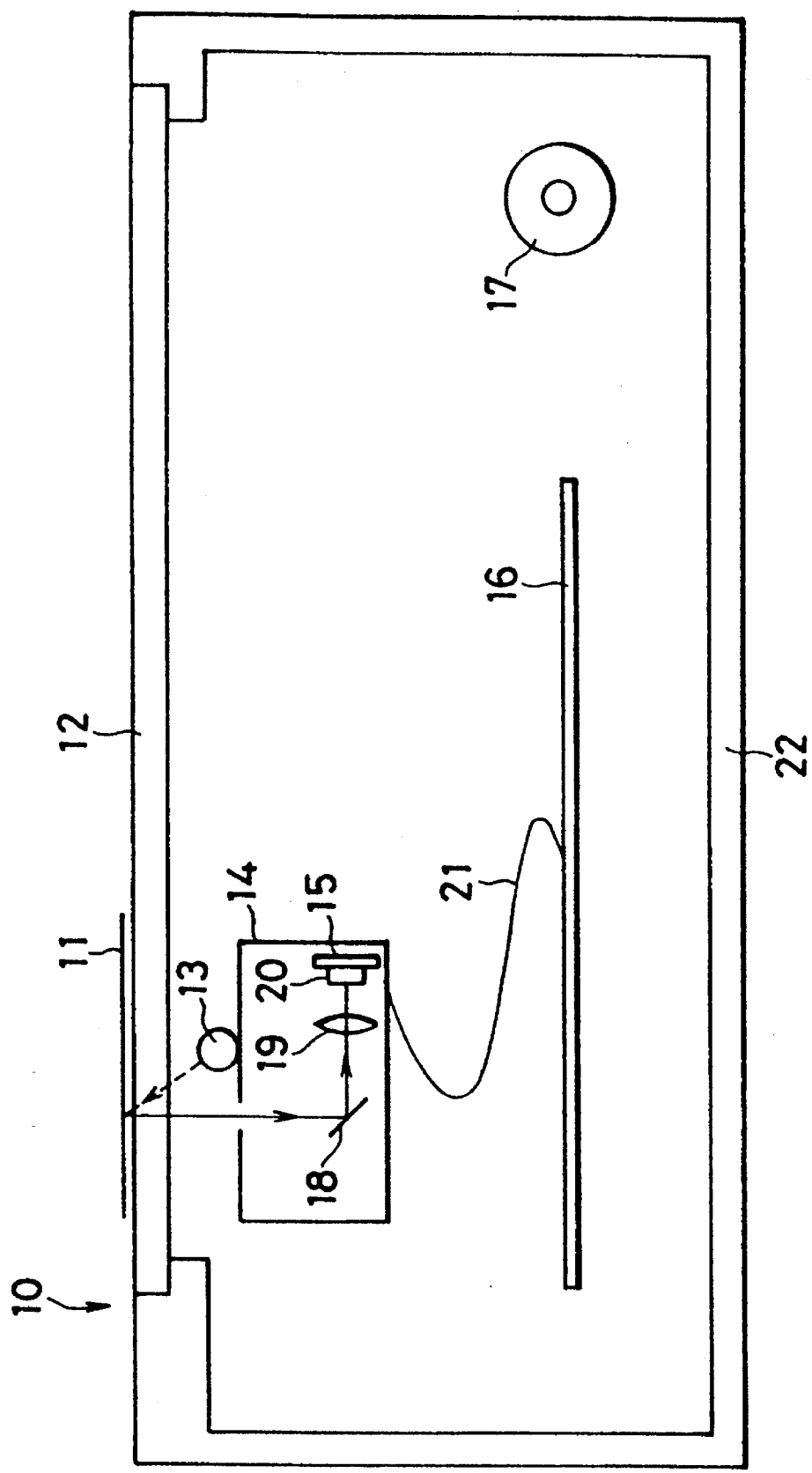
FIG. 15 is a schematic view showing a conventional scanning device.

The operation of the scanning device is the same as that of the conventional scanning device shown in FIG. 15. Hence, the description about the operation is left out.

Figure 17:
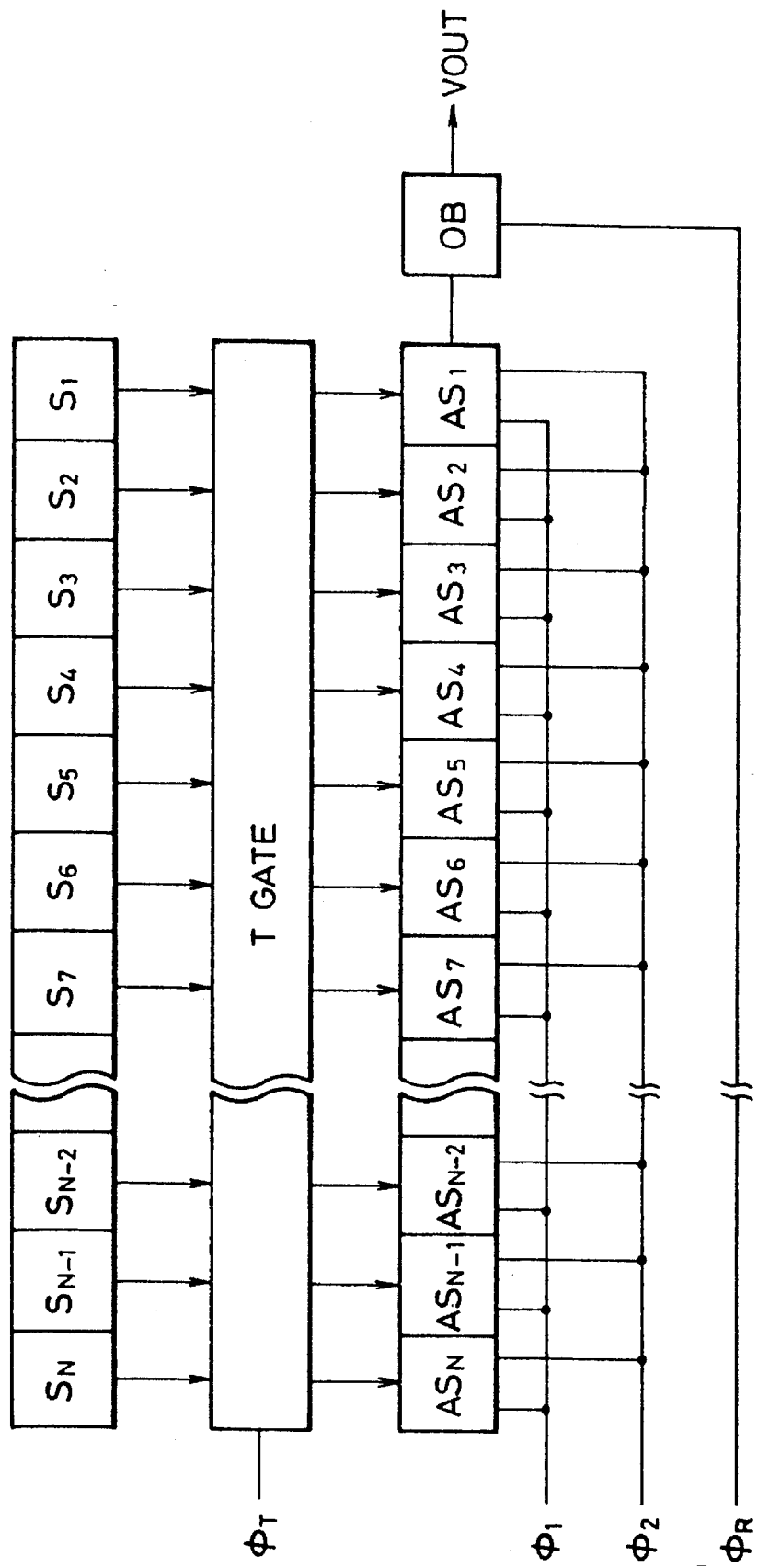
FIGS. 17 to 18 are block diagrams showing a CCD sensor.
Figure 18:
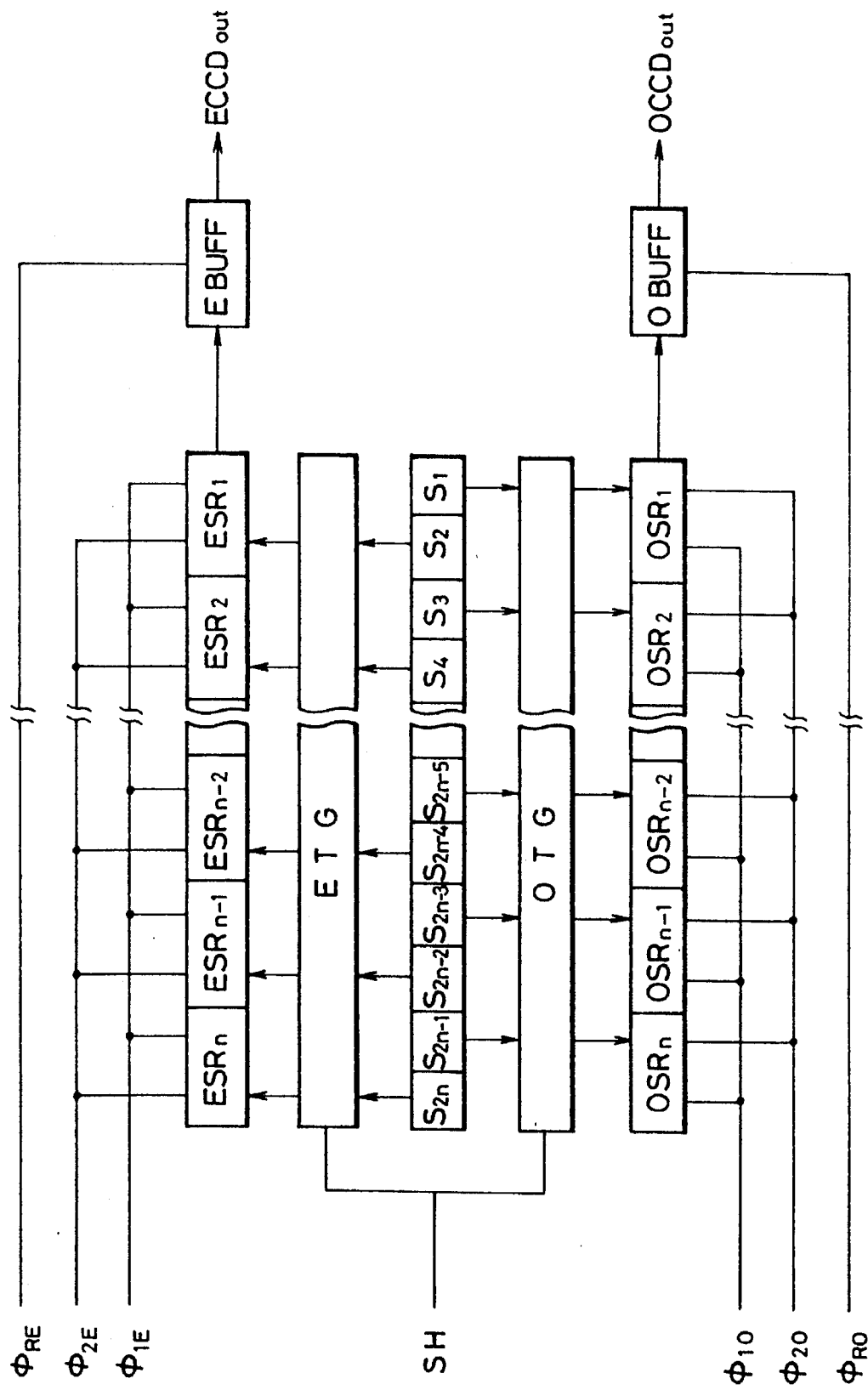
Figure 19:
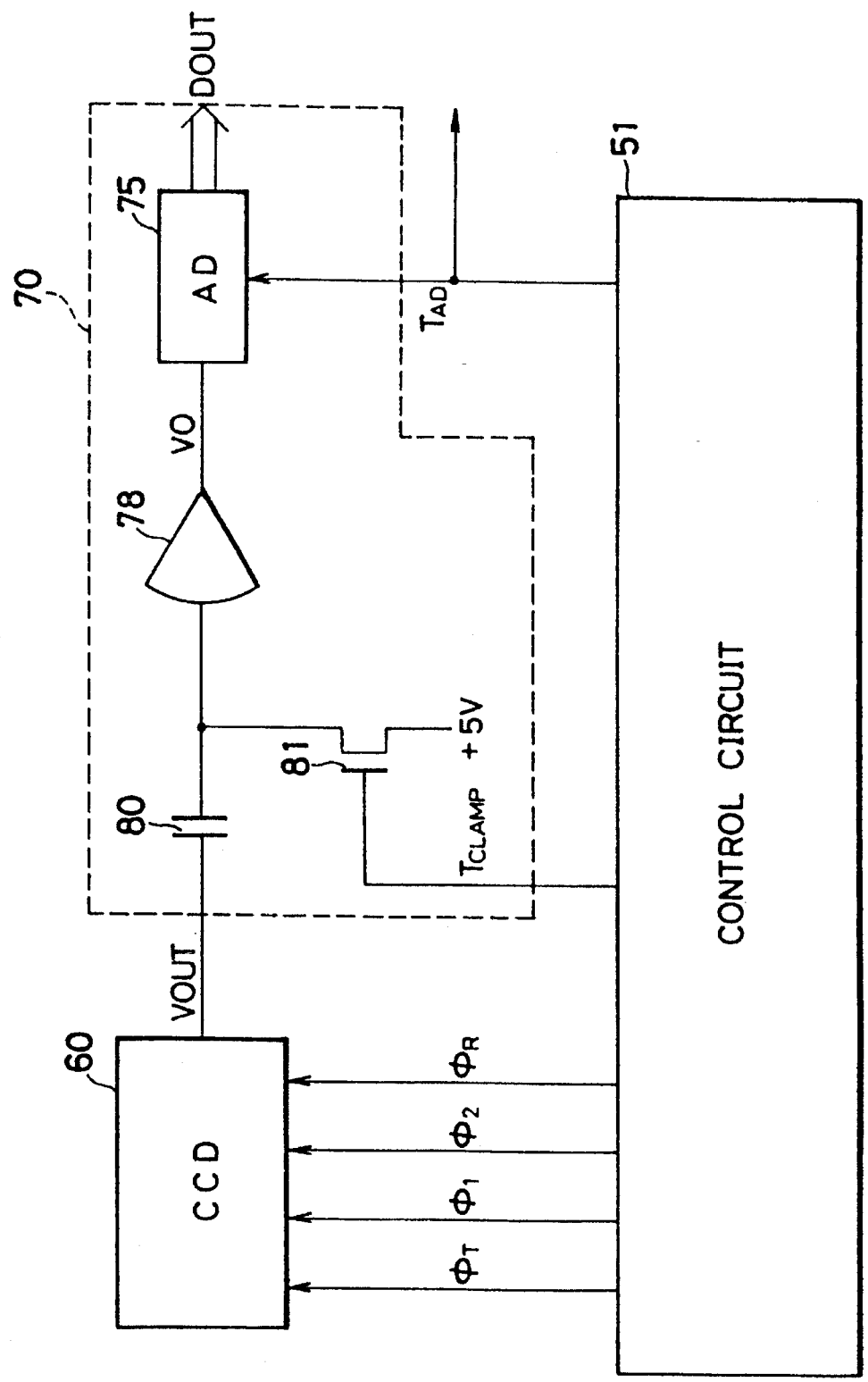
FIG. 19 is a block diagram showing a conventional sensing circuit.
Figure 20:
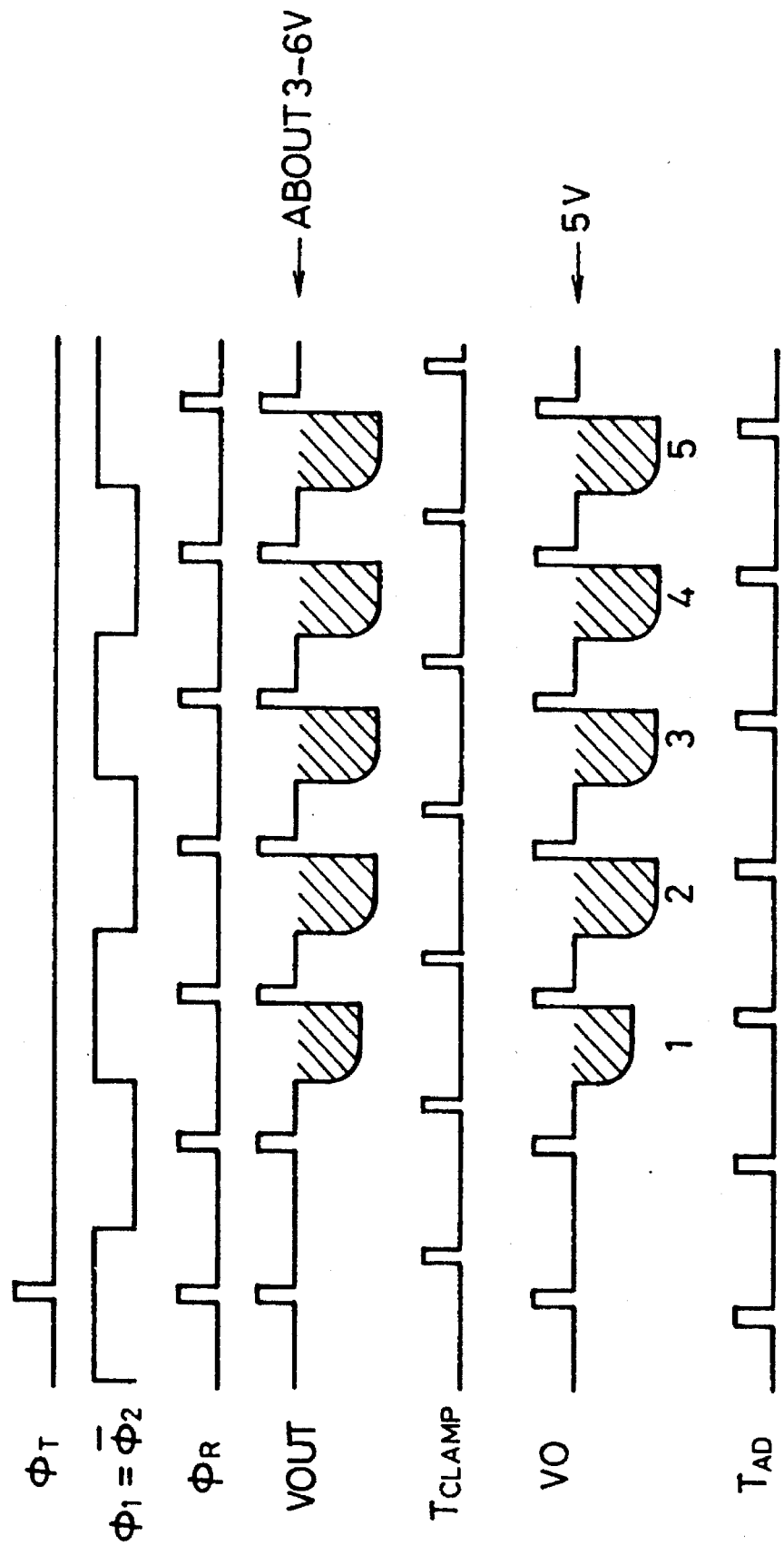
FIG. 20 is a timing chart showing signal timings of the circuit shown in FIG. 19.
Figure 21A:
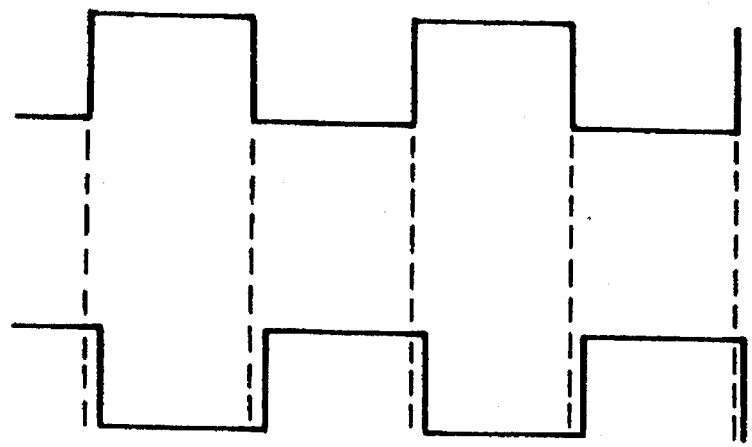
FIGS. 21a and 21b are views showing signal waveforms in the conventional scanning device and the present invention.
Figure 21B:
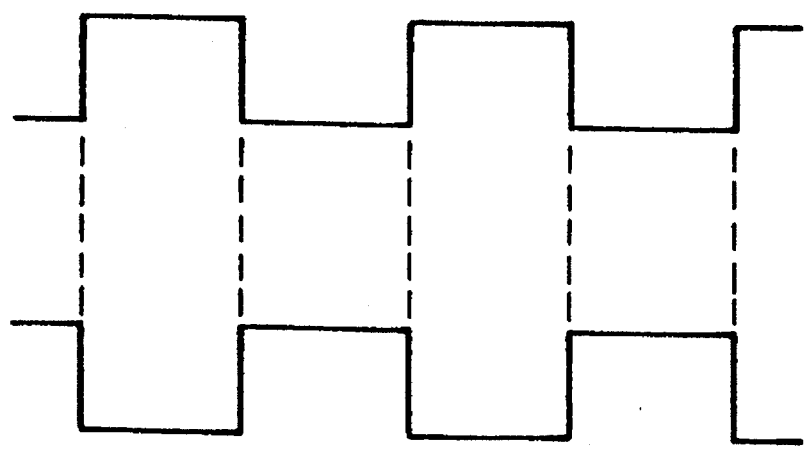
Figure 22:
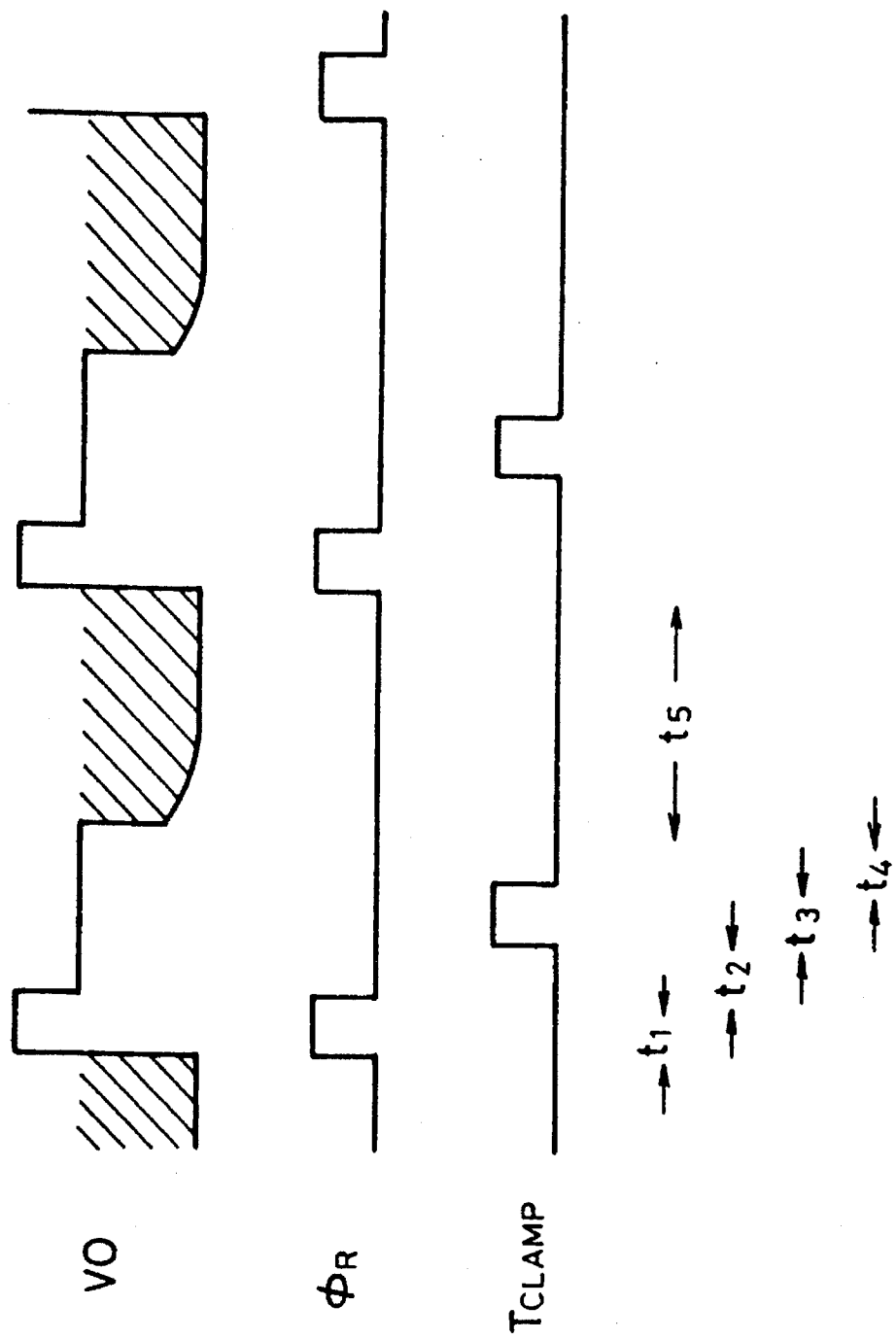
FIG. 22 is a timing chart showing signal timings of the conventional circuit.

Further, the CCD sensor 20 is not described herein as well, because it is the same as that shown in FIGS. 17 and 18.

In this Figure, a light condensing means 23 is located for condensing a beam from the light source.

Figure 2A:
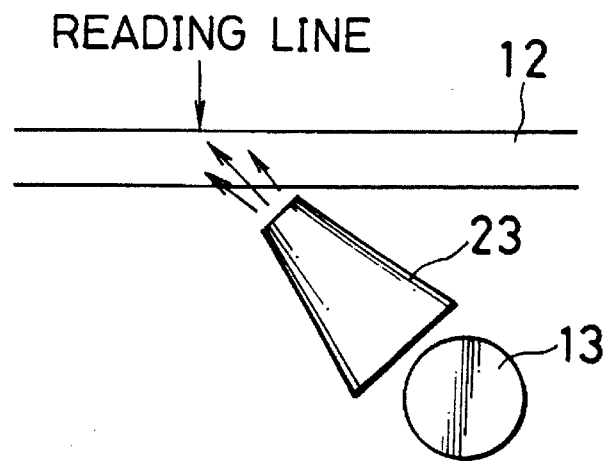
FIG. 2a is a schematic view showing a beam condensing means according to the present invention.
Figure 2B:
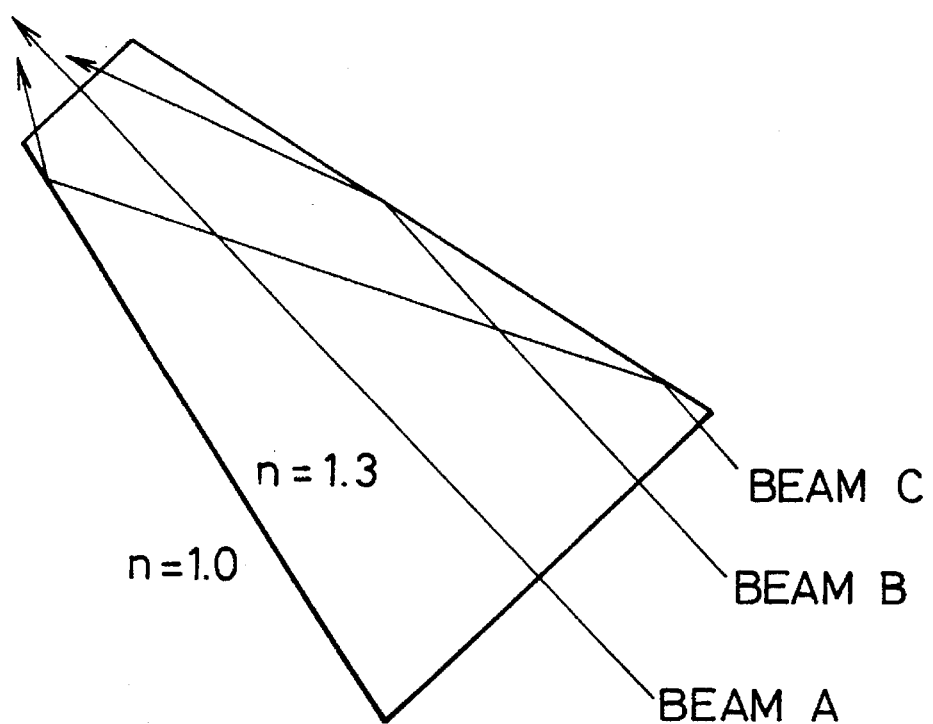
FIG. 2b is a view showing how a beam is reflected if the beam condensing means according to the invention is used.

FIGS. 2a and 2b shows a concrete arrangement of the beam condensing means.

In FIGS. 2a and 2b, the light condensing unit 23 is made of a material having a larger refractive index n than that of the air, for example, acrylic.

It is known that light is mirror-reflected if the light outgoes from the material having a refractive index n=1 to the outside, that is, the material having an refractive index of $n \leq 1$.

Figure 16:
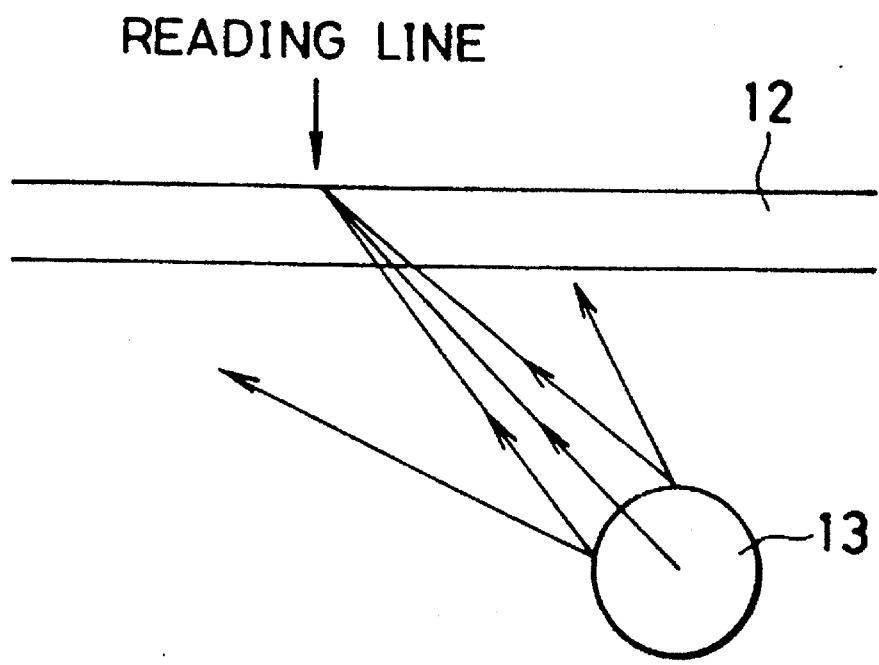
FIG. 16 is a view showing the state of a condensed beam in the conventional scanning device.

The light condensing means utilizes this principle. This principle makes it possible to overcome a shortcoming that the beam from the light source of the conventional scanning device as shown in FIG. 16 is widely dispersed with the reading line as a center and the used light is quite small. FIG. 2a shows the state in which the beam from the light source is efficiently condensed around the reading line through the effect of the light condensing unit. In FIG. 2b, the light condensing unit has a refractive index of n=1.3. In this figure, the beam B is reflected once in the light condensing unit. The beam C is reflected twice in the light condensing unit. The reflections are mirror reflections so that the beam may be efficiently condensed.

Figure 3A:
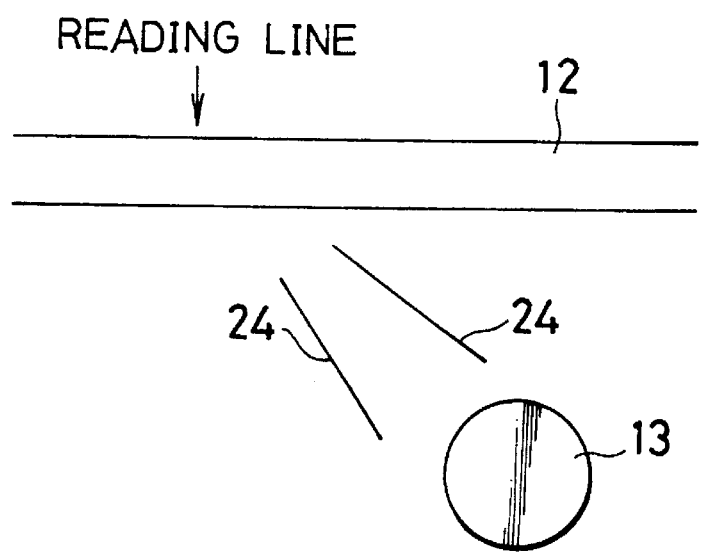
FIGS. 3a to 3c are schematic views showing another structures of a beam condensing means according to the present invention.
Figure 3B:
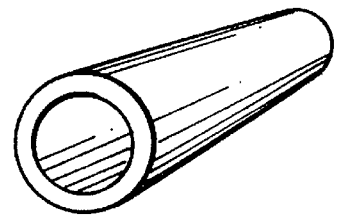
Figure 3C:
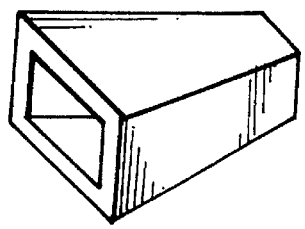

Further, the light condensing means may be composed of a mirror 24 as shown in FIG. 3a. As shown, the inside of the light condensing means is a mirror. The mirror is formed like a truncated cone as shown in FIG. 3b or a truncated pyramid as shown in FIG. 3c. The insides of these mirrors are also finished like mirror.

Figure 4A:
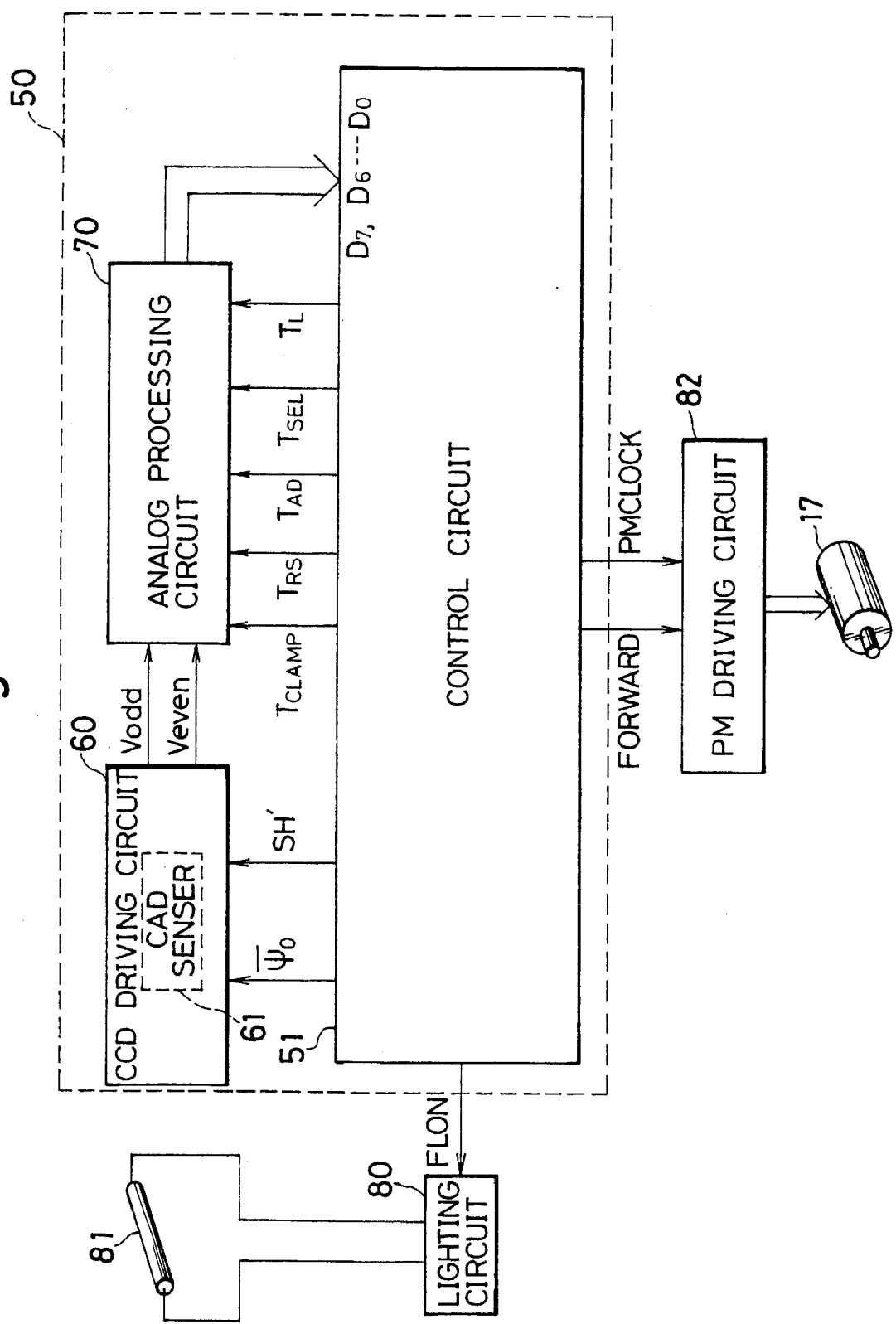

In turn, FIGS. 4a and 4b are block diagrams showing a sensing circuit used in the scanning device. The sensing circuit 50 comprises a control circuit 51, a CCD driving circuit 60 and an analog processing circuit 70.

The control circuit 51 is provided with a signal generating circuit 52 for feeding a clock signal to the CCD driving circuit 60 and the analog processing circuit 70.

The CCD driving circuit 60 is composed of a CCD sensor 61, a clock generating circuit 62 for transferring clocks to the sensor, an input circuit 64 provided with a reset pulse generating circuit 63 for feeding a reset pulse, and an output circuit 65 for feeding a signal from the CCD sensor 61.

The input circuit 64 is mounted on the same board as the CCD sensor 61.

Further, each of the circuits composing the driving circuit is provided on the board on which the CCD 61 is mounted. In this case, it is preferable to compose the driving circuit on a single chip.

The analog processing circuit 70 is composed of a clamp circuit 71 for clamping an output signal from the output circuit 65, an analog-to-digital converter 72 for converting a digital signal from the driving circuit to an analog signal, a data selector circuit 73 for selecting a signal from the converter 72, and a latch circuit 74 for latching a signal from the selector circuit 73.

The signal generating circuit 52 operates to feed signals $\overline{\psi_0}$, SH' to the clock generating circuit 62 and the reset pulse generating circuit 63, signals $T_{CLAMP}$ and TRS to the clamp circuit 71 of the analog processing circuit, a signal $T_{AD}$ to the analog-to-digital converter 72, a signal $T_{SEL}$ to the data selector circuit 73, and a signal TL to a latch circuit 74.

Further, in order to pick up an output signal from the CCD driving circuit separately for an even side and an odd side, the even side output Veven and the odd side output Vodd are fed to the analog processing circuit 70. The analog processing output circuit 70 operates to output the converted analog signals $D_0$ to $D_7$ to the control circuit 51.

In FIGS. 4a and 4b, a numeral 80 denotes a lighting circuit. When a signal FLON has a value of "1", the lighting circuit 80 operates to turn on a fluorescent lamp 81. A numeral 82 denotes a PM driving circuit. If the signal PMCLOCK signal rises to "1" once when a signal FORWARD has a value of "1", the PM driving circuit operates to drive the pulse motor 17 so that the optical unit 14 as shown in FIG. 1 may travel by a distance of 1/16 mm, for example. On the other hand, if the signal PMCLOCK rises to "1" once at the time of the signal FORWARD="0", the pulse motor 17 operates to travel back the optical unit by a distance of 1/16 mm.

Next, the description will be oriented to the operation of the scanning device arranged as described above.

Figure 5:
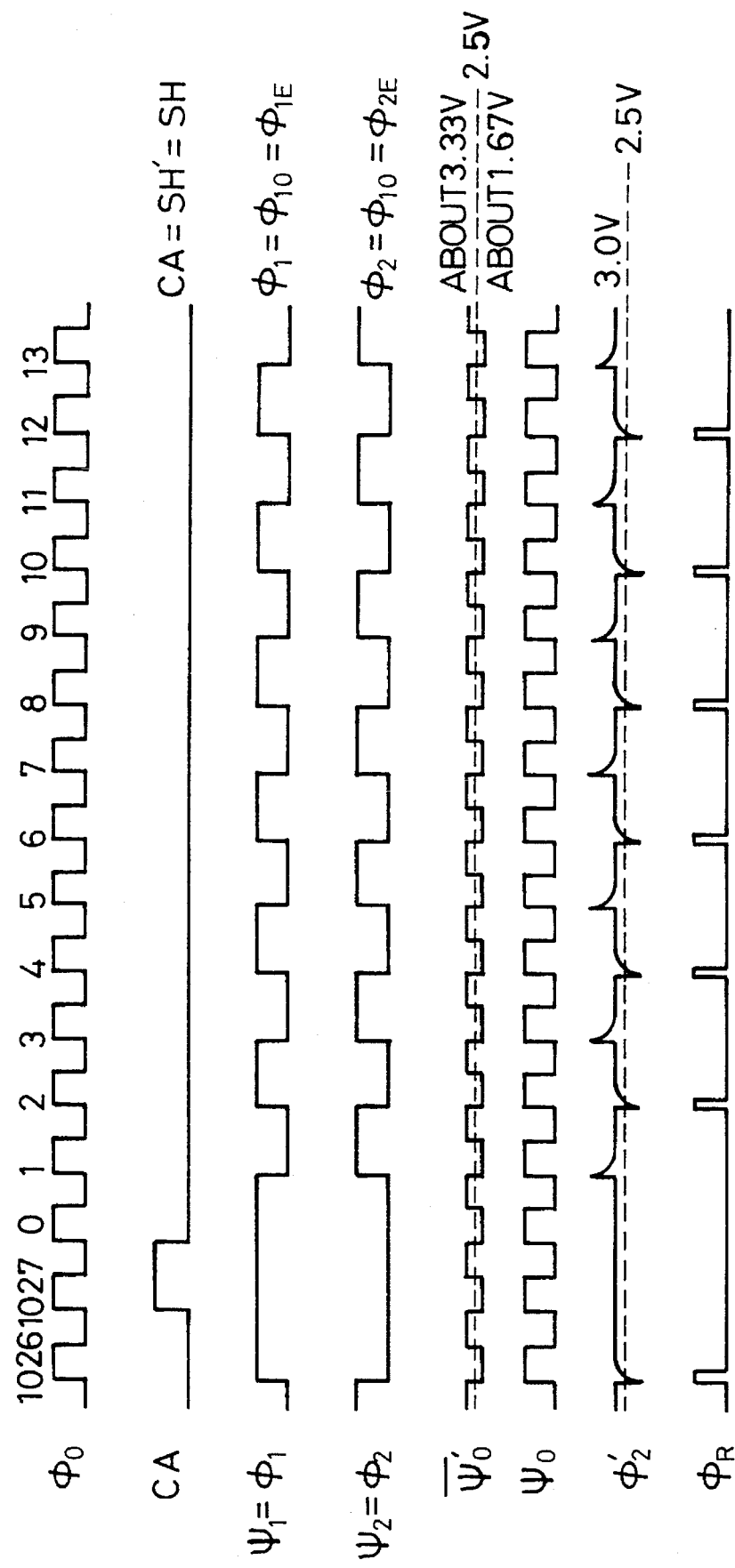
FIGS. 5 to 6 are timing charts showing a sensing circuit according to the present invention.
Figure 6:
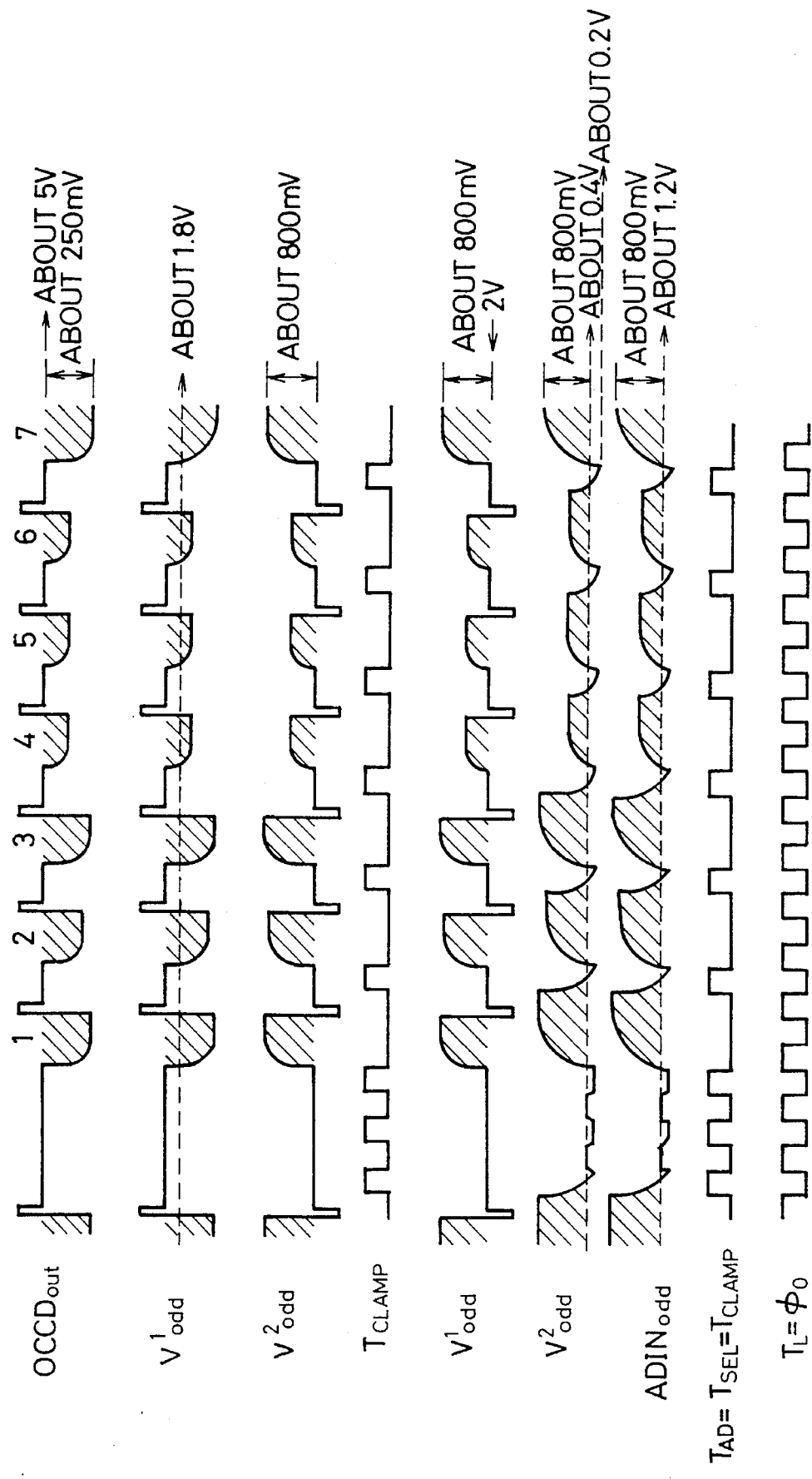

FIGS. 5 and 6 are timing charts showing signal timings of the sensing circuit. The signals about the shown timings are a fundamental clock $\phi_0$, a 1028 digit output CA of a 1028 digit counter, CCD sensor driving signals $\phi_1$, and $\phi_2$ (which are the reverse of each other) and the reverse of $\phi_0$', the signal $\psi_0$, the signal $\phi_2$' an odd side output OCCDout of the CCD sensor, driving signals $v^1$odd and $v^2$odd for driving the analog processing circuit, a clamp signal $T_{CLAMP}$, an input signal ADINodd of an odd side analog-to-digital converter, a converter sampling signal $T_{AD}$ and a latch signal TL.

Figure 7:
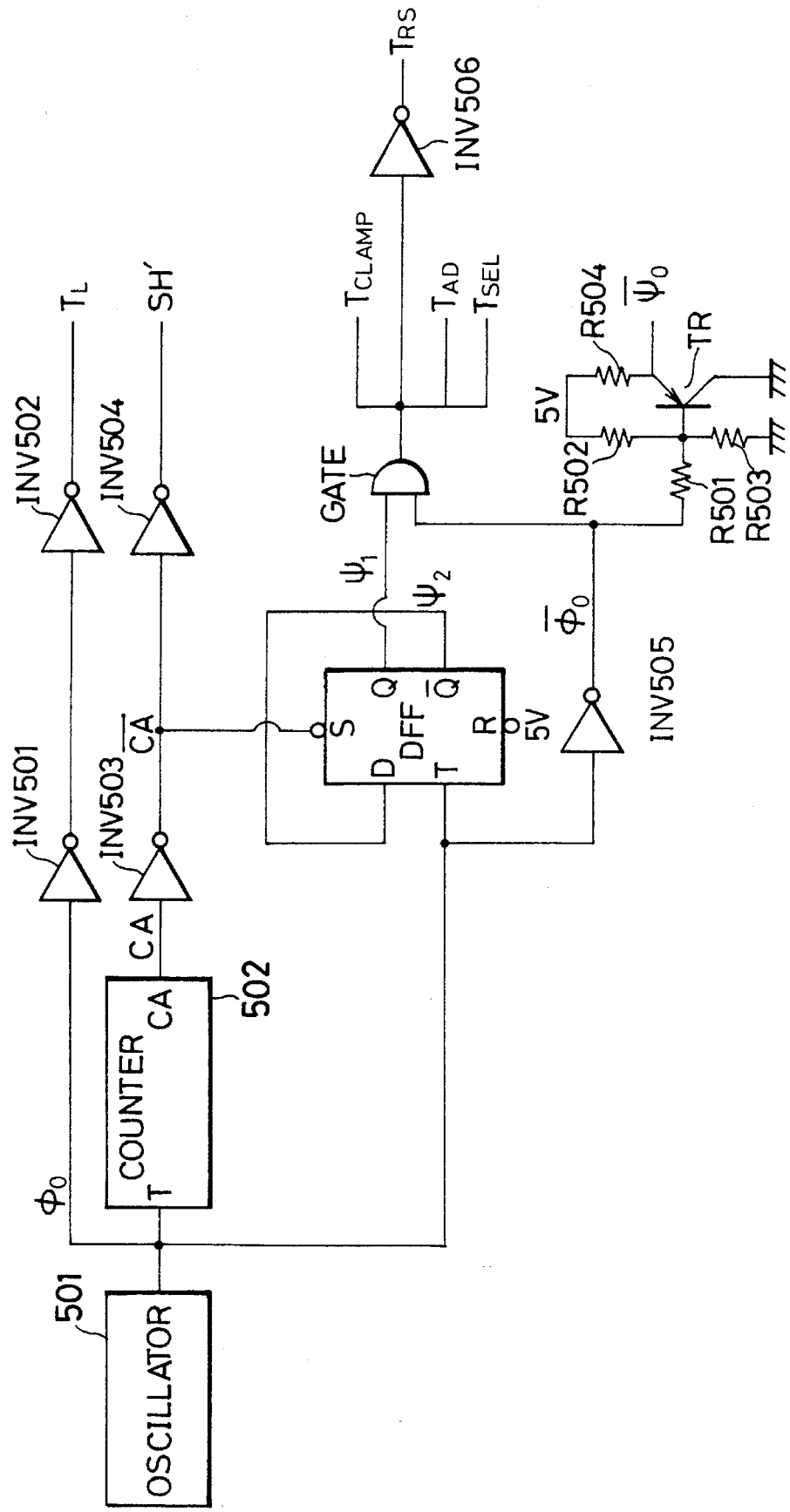
FIG. 7 is a circuit diagram showing a control clock generating circuit according to the present invention.

Turning to FIG. 7, an output of an oscillator is made to be $\phi_0$, so that inverters INV501 and INV502 may generate the latch signal $T_L$. The counter 502 is a 1028 digit counter, the clock of which is $\phi_0$. Each time $\phi_0$ is counted 1028 times, the 1028 digit output CA is made high during one clock (see FIG. 5). The 1028 digit output CA is made to be SH' through the effect of the inverters INV503 and INV504.

The output $\psi_1$ of a D flip-flop DFF is set during a LOW period of the CA. Each time $\phi_0$ rises after it is set, the output $\psi_1$ is reversed. $\psi_2$ is a reversed signal of $\psi_1$.

$T_{CLAMP}=T_{AD}=T_{SEL}$ is a signal formed by taking a logical AND of the reversed signals of $\psi_1$ and $\phi_0$.

The base potential of the transistor is about 1.67 volt when the reversed signal of $\phi_0$ has a value of 0 volt. The base potential is about 3.33 volts when the reversed signal has a value of 5 volts. Hence, when the voltage between the base and the emitter of the transistor TR is 0.8 volt, the reversed signal of $\psi_0$ is swung from about 2.47 volts to about 4.13 volts. The reversed signal of the clock $\psi_0$ for producing $\phi_1$ and $\phi_2$ in the input circuit of the CCD is made to be a signal corresponding to an attenuated reversed signal of $\phi_0$. The reversed signal $\psi_0$ is a signal having a value of about 5 $V_{PP}$. The reversed signal of $\psi_0$ is a signal having a value of about 1.66 $V_{PP}$. Hence, though the signal $\phi_0$ is transmitted through a long signal cable, the signal does not bring about radio wave noises.

In turn, FIG. 7 is a circuit diagram showing a signal generating circuit included in the control circuit.

In FIG. 7, the output of the oscillator 501 is connected to the input of the inverter INV501. The output of the inverter INV501 is connected to the input of the inverter INV502. The inverter INV502 outputs the signal $T_L$.

Further, the output $\phi_0$ from the oscillator 501 is sent to a T input of the counter 502. The output CA of the counter 502 is connected to the inverter INV 503. The reversed signal of the output CA of the inverter INV 503 is sent to the input of the inverter 504. As such, the inverter 504 outputs a signal SH'.

The output $\phi_0$ is connected to a T input of a D flip-flop DFF. The reversed signal of the output CA is applied to an S input of a flip-flop DFF. Then, a power supply of 5 V is connected to the R input of the flip-flop DFF. The reversed signal $\psi_2$ of a Q output of the D flip-flop DFF is connected to a D input. The Q output of the D flip-flop DFF is outputted as the signal $\psi_1$. The signal $\phi_0$ is applied to the input of the inverter INV 505. The reversed signal of the output $\phi_0$ of the inverter INV 505 is applied to one input of the AND gate GATE. The signal $\psi_1$ is applied to the other input of the AND gate GATE. The AND gate GATE operates to output the signals $T_{CLAMP}$, $T_{AD}$ and $T_{SEL}$. The output of the AND gate GATE is applied to the input of the inverter INV 506. The inverter INV 506 outputs the signal TRS.

The reversed signal of the signal $\phi_0$ is connected to one end of a resistor R501 (300Ω). The other end of the resistor R501 is connected to one end of a resistor R502 (300Ω), one end of a resistor R503 (300Ω) and a base of the transistor TR. The other end of the resistor R502 is a 5-volt power supply and the other end of the resistor R503 is connected to the ground. The collector of the transistor TR is also connected to the ground. The emitter of the transistor TR is connected to one end of the resistor R504 (100Ω) so that the reversed one of the signal $\psi_0$ may be outputted at the emitter. The other end of the resistor R504 is connected to a 5-volt power supply.

Figure 8:
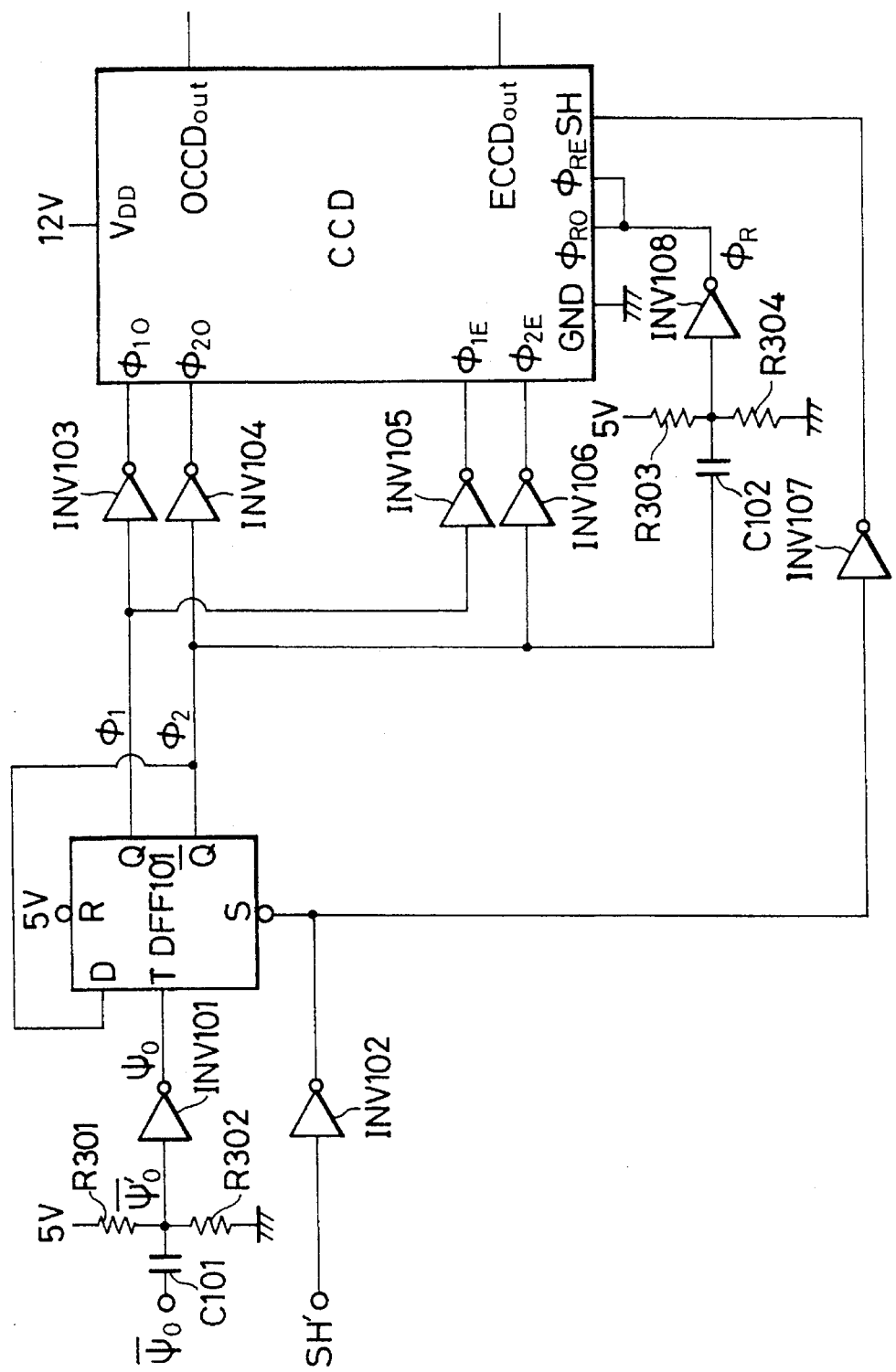
FIGS. 8 and 9 are circuit diagrams showing a circuit for driving a CCD according to the present invention, in which FIG. 8 mainly shows an input circuit
Figure 9:
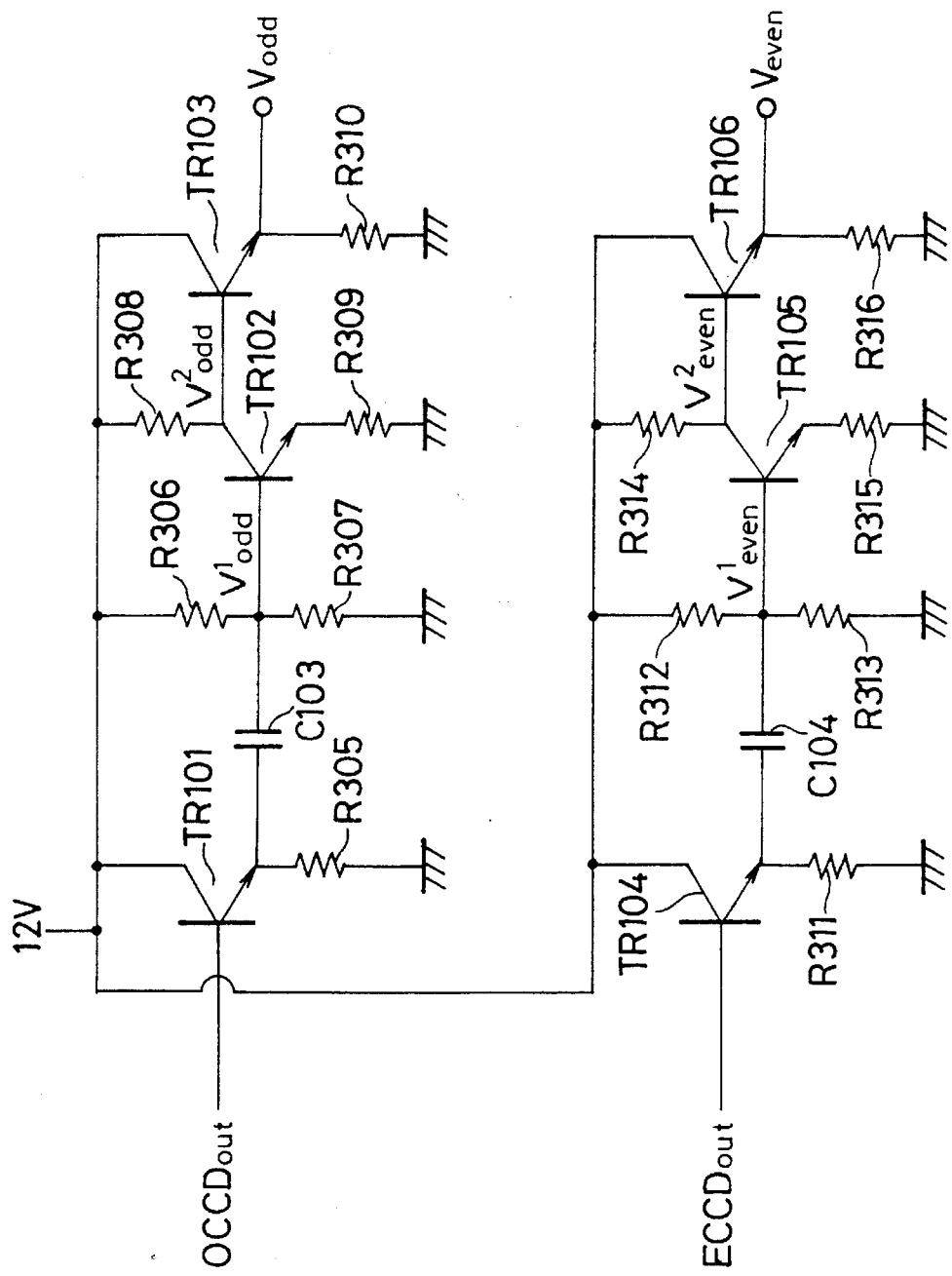

Then, FIGS. 8 and 9 are circuit diagrams showing a CCD driving circuit, in which FIG. 8 shows the clock generating circuit and the reset pulse generating circuit.

In FIG. 8, the reversed one of the signal $\psi_0$ is applied to one end of the capacitor C101 (0.1 μF). The other end of the capacitor is applied to each one end of a resistor R301 (2.2 kΩ) and a resistor R302 (2.2 kΩ) so that the capacitor C101 may output a reversed signal of $\psi_0$'. The other end of the resistor R301 is connected to a 5-volt power supply. The other end of the resistor R302 is connected to the ground.

The reversed signal of $\psi_0$' is connected to an input of the inverter INV 101 so that the inverter INV 101 may output the signal $\psi_0$.

The signal $\psi_0$ is applied to a T input of the D flip-flop DFF 101. The R input of the flip-flop is connected to the 5-volt power supply. The Q output of the D flip-flop 101 outputs the signal $\phi_1$. At the reversed output of Q, the signal $\phi_2$ is outputted. The reversed output of Q is connected to the D input of the D flip-flop 101. The signal SH' is applied to the input of the inverter INV 102. The output of the inverter INV 102 is connected to an S input of the D flip-flop DFF 101 and an input of the inverter INV 107. The output of the inverter INV 107 is connected to an SH input of the CCD sensor CCD as shown in FIG. 18.

The signal $\phi_1$ is applied to the inputs of the inverters INV 103 and INV 105. The output of the inverter INV 103 is connected to an $\phi_{1O}$ input of the CCD sensor CCD. The output of the inverter INV 105 is connected to a $\phi_{1E}$ input of the CCD sensor CCD.

The signal $\phi_2$ is applied to an input of the inverter INV 104, an input of the inverter INV 106, and one end of the capacitor C102 (10 PF). The output of the inverter INV 104 is connected to a $\phi_{2O}$ input of the CCD sensor CCD. The output of the inverter INV 106 is connected to a $\phi_{2E}$ input of the CCD sensor CCD. The other end of the capacitor C102 is connected to each one end of a resistor R303 (2.2 kΩ) and a resistor R304 (3.3 kΩ) so that the signal $\phi_2$' may be outputted at that end of the capacitor C102. The other end of the resistor R303 is connected to a 5-volt power supply. The other end of the resistor R304 is connected to the ground.

The signal $\phi_2$' is applied to the input of the inverter INV 108. At the output of the inverter INV 108, the signal $\phi_R$ is outputted. The output of the inverter INV 108 is connected to a $\phi_{RO}$ input and $\phi_{RE}$ input of the CCD sensor CCD.

The $V_{DD}$ input of the CCD sensor CCD is connected to the 12-volt power supply. The GND input of the CCD sensor CCD is connected to the ground.

The CCD sensor CCD operates to output the signal OCCDout at the OCCDout output or the signal ECCDout at the ECCDout output.

In turn, the description will be oriented to FIG. 9 which is a circuit diagram showing an output circuit.

In FIG. 9, the signal OCCDout is applied to the base of the transistor TR101. The collector of the transistor TR101 is connected to a 12-volt power supply. The emitter of transistor TR101 is connected to the ground through a resistor R305 (470Ω) and to one end of a dc cutting capacitor C103 (1 μF). The d.c. cutting capacitor 103C, DC level-shift resistors R306 and R307, amplifying resistors R308 and R309, and an amplifying transistor TR102 composes an amplifying circuit for quickly amplifying a CCD signal. The amplifying circuit enables to quickly process a signal at one power supply, low cost and fast speed. The conventional amplifying circuit uses an operational amplifier. In this case, however, the amplifying circuit for amplifying a signal of 10 MHz or more is costly and needs a positive and a negative power supplies. The capacitor C103 outputs a signal vodd1 at the other end. This end is connected to a 12-volt power supply through the DC level-shift resistor R307 (1.8 kΩ) and to the ground through the DC level shift resistor R307 (1.8 kΩ). The signal vodd1 is applied to the base of the amplifying transistor TR102. The transistor TR102 serves to output the signal vodd2 at its collector. The collector of the transistor TR102 is connected to the 12-volt power supply through the amplifying resistor R808 (330Ω). The emitter of the transistor TR102 is connected to the ground through the amplifying resistor R809 (100Ω). The signal vodd2 is applied to the base of the transistor TR103. The collector of the transistor TR103 is connected to the 12-volt power supply. The transistor TR103 outputs a signal Vodd at its emitter. The emitter is connected to the ground through the resistor R310 (220Ω).

After the OCCDout, the foregoing description has concerned with the output circuit on the odd side. The output circuit on the even side is the same as that on the odd side after the OCCDout on the signal flow. Hence, the output circuit on the even side will not be described here.

The CCD driving circuit as shown in FIGS. 8 and 9 operates as follows.

The reversed signal of $\psi_0$ is sent from the analog processing circuit 70 and the control circuit 51 shown in FIG. 4a through the signal cable 18. At the high level, the reversed signal keeps about 4.13 volts. At the low level, the reversed signal keeps about 2.47 volts.

To receive a signal with a small amplitude, the d.c. cutting capacitor is connected in series with the input terminal of the input circuit of the CCD sensor. To positively transmit the signal, the reversed signal of $\psi_0'$ is used. The reversed signal is formed by shifting the reversed signal of $\psi_0$ with a threshold (about 2.5 volts) of the receiving IC (INV 101, herein, 74ACO4). That is, the reversed signal of $\psi_0$ is applied to a contact between the resistors R301 and R302 through the d.c. cutting capacitor C101 (0.01 ∥F). Since R301=R302=2.2 kΩ, the average d.c. current o the inverter INV101 is 2.5 volts. The inverter INV101 is 74ACO4, the input threshold voltage of which is roughly a half of the power supply of 5 volts, that is, 2.5 volts.

The values of the resistors R301 and R302 are defined so that the average d.c. potential of the reversed signal of the input signal $\psi_0'$ of the inverter INV101 may be made to be a threshold potential of the input of the INV 101.

Hence, the reversed signal of $\psi_0'$ is swung around the voltage of 2.5 volts as shown in FIG. 5.

A time constant of C101×R301 is set to be sufficiently longer than a period of $\phi_0=\psi_0$ (100 nsec). Herein, from C101=0.1 μF and R301=2.2 kΩ, it is understood that C101× R301 is equal to 22 μsec.

The outputs $\phi_1$ and $\phi_2$ of Q of the D flip-flop DFF101 are the same as the signals $\psi_1$ and $\psi_2$ as shown in FIG. 5 (see FIG. 5).

Herein, the signal $\phi_2$ is applied to the contact between R303 and R304 through the capacitor C102 (10 PF). The contact is connected to the input of the inverter INV 108.

The average d.c. potential at the contact is set as 3 volts so that it may be set to be higher than the threshold of the input of the inverter INV 108 (74ACO4) by one volt. On the other hand, the capacitor C102 is set to have a smaller capacitance of 10 PF.

Herein, when the signal $\phi_2$ is lowered from the High to the Low, the signal $\phi_2'$ is momentarily lower than 2.5 volts as shown in FIG. 5. From that point, the value comes closer to 3 volts at the time constant of:

$$C102 \times (R303 \times R304/R303 + R304) =$$

$$10 \, PF \times (R303 \times R304/R303 + R304) = 13 \, \text{nsec}$$

Hence, the output $\phi_R$ of the inverter INV 108 is made to be a pulse signal having an amplitude of about 10 nsec starting from the rise of $\phi_2$.

In FIG. 8, for the inverters INV 103, INV 104, INV 105, and INV 106, 74AC240 are used. These inverters serve to apply the signals $\phi_{1O}$, $\phi_{2O}$, $\phi_{1E}$, and $\phi_{2E}$ to the CCD sensor CCD.

The CCD sensor receives a shift pulse SH at the odd side transfer gate of OTG and the even side transfer gate of ETG. The charges received and stored in the sensor are transferred to the analog shift registers on the odd and the even sides. The charges transferred to these analog shift registers are then transferred to the output buffers on the odd side and the even side based on the clocks $\phi_{1O}$, $\phi_{2O}$, $\phi_{1E}$, and $\phi_{2E}$.

The charges transferred to the output buffers are reset on the clocks $\phi_{RO}$ and $\phi_{RE}$ (that is, $\phi_{RO}=\phi_{RE}=\phi_R$).

Herein, since $\phi_{1O}=\phi_{1E}=\phi_1$, $\phi_{2O}=\phi_{2E}=\phi_2$ and $\phi_{RO}=\phi_{RE}=\phi_R$, the output OCCDout has the same phase (timing) as the output ECCDout. Hence, the description will be oriented to only processing of the signal for the odd side.

In FIG. 9, the signal OCCDout is impedance-converted through the effect of an emitter follower of the transistor TR101 and then is applied to the capacitor C103 (1 μF). One end of the capacitor C103 is connected to a contact between the resistors R306 and R307 and a base of the transistor TR102. Since the resistor R306 has a value of 10 kΩ and the resistor R307 has a value of 1.8 kΩ, the average d.c. potential of $V^1$odd is about 1.8 volt. Assuming that the voltage between the base and the emitter of the transistor TR102 is 0.8 volt, the average d.c. potential of the emitter of the transistor TR102 is about 1.0 volt. When the potential varies by $\Delta x$ on the basis of the value of 1.0 volt, assuming that the emitter current of the transistor TR102 is IE+ΔIE, IE+ΔIE is;

$$I_E + \Delta I_E = (1.0 + \Delta_x)/R309 = (1.0 + \Delta_x)/100$$

At this time, assuming that the current flowing through the collector is nearly equal to the current flowing through the emitter, the potential at the collector is;

$$12 - V_c = 12 - R308(I_E + \Delta I_E) = 12 - 330/100(1.0 + \Delta_x) =$$

$$12 - 3.3 - 3.3 \, \Delta_x$$

That is, if the potential of $V^1$odd changes by $\Delta x$, $V^2$odd is reversely amplified. Concretely, the signal $V^2$odd is made about −3.3 times larger. That is, if the signal OCCDout has a value of about 250 mV, the signal $V^2$odd is amplified to about 800 mV. (see FIG. 6).

The signal $V^2$odd is impedance-converted by the emitter follower circuit composed of the transistor 103 and the resistor R310 and then sent to the next analog processing circuit.

Figure 10:
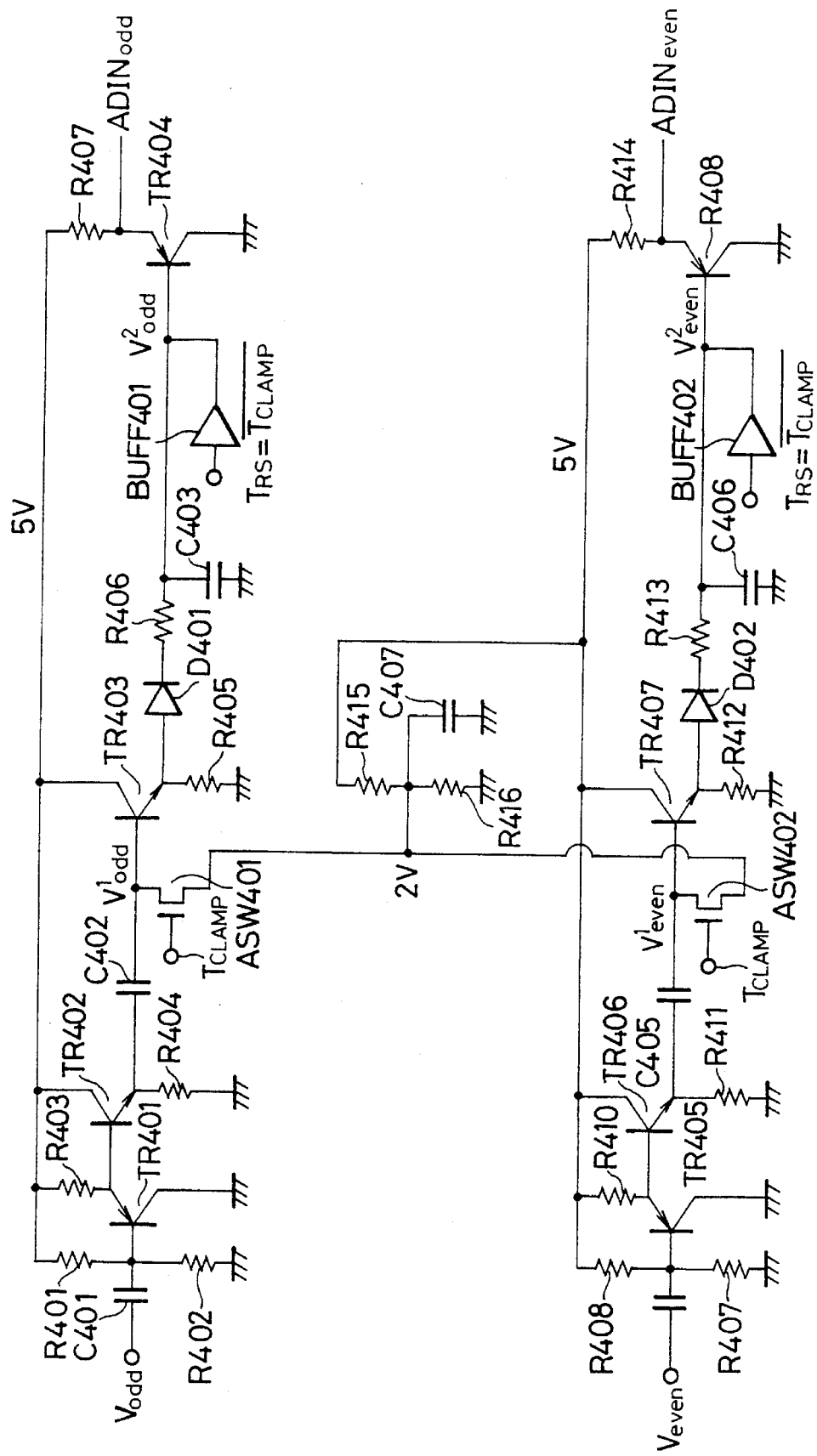
FIG. 10 is a circuit diagram showing a clamp circuit included in an analog processing circuit according to the present invention.
Figure 11:
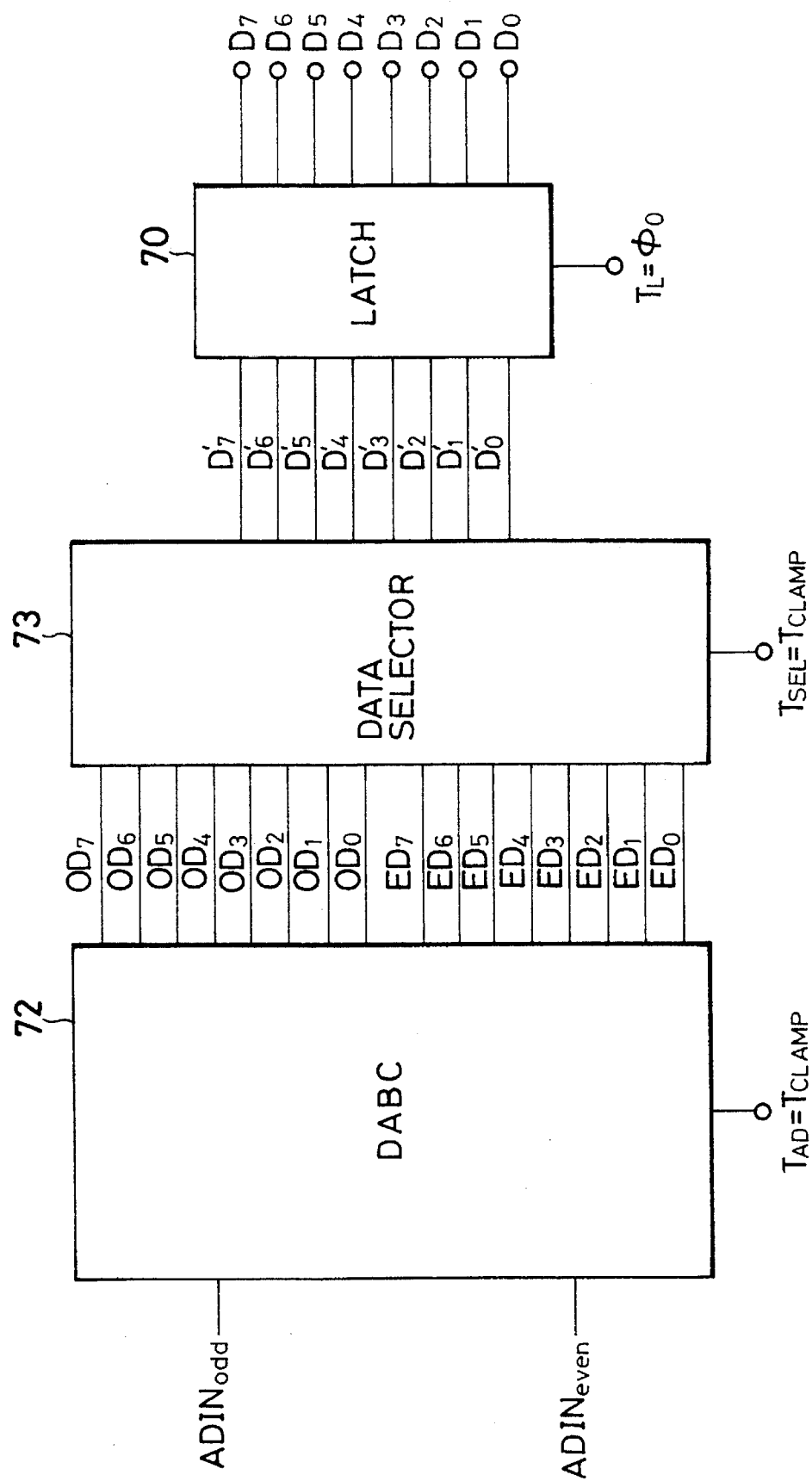
FIG. 11 is a block diagram showing an analog processing circuit according to an embodiment of the present invention.

FIGS. 10 and 11 show an analog processing circuit, in which FIG. 10 shows a clamp circuit.

In these figures, the signal Vodd is applied to one end of a capacitor C401 (1 μF). The other end of the capacitor C401 is connected to one end of a resistor R401 (3.3 kΩ), one end of a resistor R402 (2.2 kΩ) and a base of a transistor TR401. The other end of the resistor R401 is connected to a 5-volt power supply. The other end of the resistor R402 is connected to the ground. The collector of the transistor TR401 is connected to the ground. The emitter of the transistor TR401 is connected to a 5-volt power supply through a resistor 403 (470Ω) and a base of a transistor TR402, the collector of which is connected to the 5-volt power supply. The emitter of the transistor TR402 is connected to the ground through a resistor R404 (470Ω) and to one end of a capacitor C402 (1000 PF). The capacitor C402 outputs the signal $V^1$odd at the other end thereof.

The signal $V^1$odd is applied to the base of a transistor TR403 and to the drain of an analog switch ASW401, the gate of which receives the signal $T_{CLAMP}$. The source of the analog switch ASW401 is connected to the 5-volt power supply through a resistor R415 (330Ω), the ground through a resistor R416 (220Ω), and one end of a capacitor C407. The other end of the capacitor C407 is connected to the ground. The collector of the transistor TR403 is connected to the 5-volt power supply. The emitter of the transistor TR403 is connected to the ground through a resistor R405 (470Ω) and one end of a diode D1, the other end of which is connected to one end of a resistor R406 (10Ω). The resistor R406 feeds the signal $V^2$odd at the other end thereof, which is connected to a capacitor C403 (470 PF). The signal TRS is applied to an input of a buffer BUFF 401. The output of the buffer BUFF 401 is connected onto a line of the signal $V^2$odd.

The signal $V^2$odd is applied to a base of a transistor TR402, the collector of which is connected to the ground. The transistor feeds a signal ADINodd at the emitter thereof, which is connected to the 5-volt power supply through a resistor 407 (470Ω). In FIG. 11, the signal ADINodd is applied to an analog input of an analog-to-digital converter DADC. A sampling signal $T_{AD}$ is applied to the analog-to-digital converter DADC. The digital outputs OD0 to OD7 for the odd side of the analog-to-digital converter DADC are applied to one input of a data selector 401. The digital outputs ED0 to ED7 for the even side of the digital-to-analog converter DADX are applied to the other input of the data selector. The data selector 401 receives a select signal $T_{SEL}$. The outputs D'0 to D'7 of the data selector 401 are applied to the input of a latch circuit LATCH, which operates to output the data D0 to D7. A latch signal TL is fed to the latch circuit LATCH.

Then, the description will be oriented to the operation of the analog processing circuit shown in FIGS. 10 and 11.

Vodd is applied to a contact between the resistors R401 and R402 through the d.c. cutting capacitor C401. The potential at the base of the transistor TR401 is swung to keep its average d.c. current at about 2 volts. The transistor TR401 or TR402 serves as an emitter follower and for impedance conversion. The emitter of the transistor TR402 is connected to one end of the capacitor C402 (100 PF), the other end of which is connected to one end of the analog switch ASW 401. The other end of the analog switch ASW 401 is connected to a 2-volts power supply composed of the resistors R415 and R416. A signal $T_{CLAMP}$ is applied as a control signal for the analog switch ASW 401. In the signal OCCDout shown in FIG. 6, the oblique lines indicate a light signal. A real black level (output level given when the light signal is 0) means the interval from when the signal is reset by $\phi_R$ to when the next light signal part appears.

$V^1$odd is a signal formed by reversely amplifying the OCCDout.

When the control signal $T_{CLAMP}$ for the analog switch ASW 401 is at "high", the analog switch SW is turned on. Hence, as shown in FIG. 6, $V^1$odd serves to shift the level of $V^2$odd and keeps a real black level at 2 volts.

The transistor TR403 composes an emitter follower. The emitter of the transistor TR403 is connected to the capacitor C403 (470 PF) through the diode 401 and the resistor 406 (10Ω).

The capacitor C403 holds a positive peak value. The capacitor C403 is reset by the buffer BUFF 401 (74C07) keeping an output of an open drain one by one. The Buffer BUFF 401 holds charges stored in the capacitor C403 while the input signal TRS is at "High" and discharges while the signal is at "Low".

The transistor TR404 composes an emitter follower. When the voltage between the base and the emitter of the transistor TR 403 is 0.8 volt and the forward voltage of the diode D 401 is 0.8 volt, the d.c. potential of $V^2$odd is as shown in FIG. 6.

Assuming that the voltage between the base and the emitter of the transistor TR 404 is 0.8 volt, the signal ADINodd has a real black level of about 1.2 volt. The light signal appears between 1.2 volt and 2.0 volts.

DADC means a dual analog-to-digital converter having two 8-bit analog-to-digital converters integrated on a single chip. The 8-bit (0 to 255 steps) analog-to-digital conversion between 1.1 volt and 2.1 volts of two analog inputs is carried out at the leading edge of the signal $T_{AD}$.

Then, the cause of integrating two converters on a single chips will be described. Assume that the signals AD1Nodd and AD1Neven indicate the same value of 1.8 volt as keeping the manuscript sheet to be read in a similar bright state. In this case, if two separate converters perform the independent analog-to-digital conversions, it is very likelihood that the output on the odd side has 128 steps and the output on the even side has 130 steps. If two converters are integrated on a single chip, the outputs on both the odd and the even sides has 128, 130 or 126 steps. No difference between the outputs on the even and the odd sides takes place in one scanner, though each scanner may indicate its own value.

The 8-bit output on the odd side of DADC is 0D0, 0D2, ..., 0D6, 0D7. The 8-bit output on the even side of DADC is ED0, ED2, ..., ED6, ED7. These outputs are applied to the next data selector.

The outputs of the data selector are;

When $T_{SEL}$="1", D'0=0D0, D'1=0D1 ... D'7=0D7

When $T_{SEL}$="0", D'0=ED0, D'1=ED1 ... D'7=ED7

The next latch circuit LATCH operates to send to the control circuit 101 the signals D0, D1, D2, ..., D6, D7 which are sequentially converted from the output signals of the CCD, because the used latch signal TL is the same as $\phi_0$.

Figure 12:
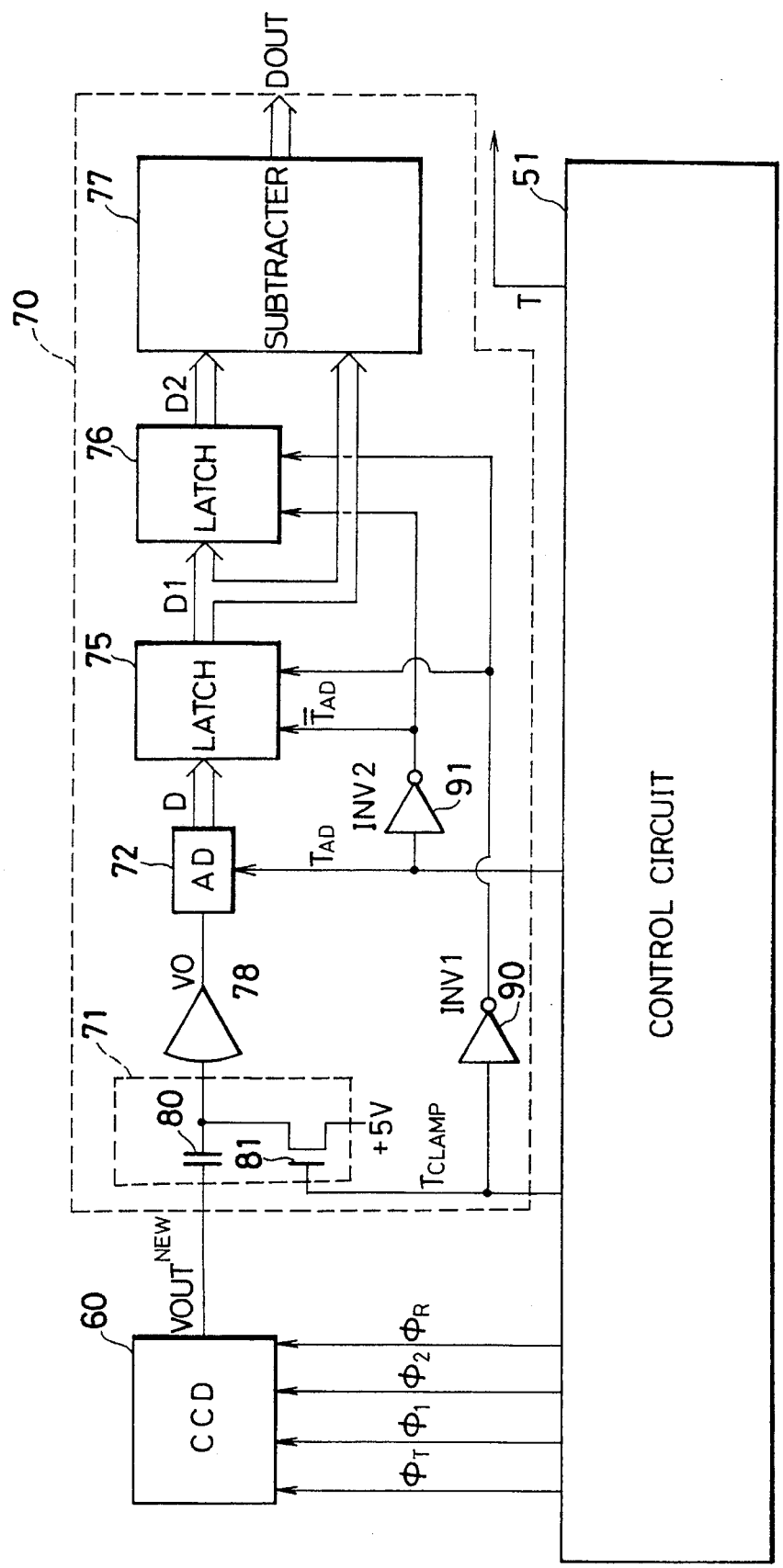
FIG. 12 is a block diagram showing an analog processing circuit according to another embodiment of the present invention.

FIG. 12 is a block diagram showing a sensing circuit provided with the analog processing circuit according to the second embodiment.

The analog processing circuit 70 comprises a clamp circuit 71 for clamping an output signal from the CCD driving circuit, an analog-to-digital converter 72 for converting a signal from the clamp circuit into a digital signal, first and second latch circuits 75 and 76 being connected in series and for receiving a digital signal from the converter 72, a subtracter 77 for subtracting the signal from the first latch circuit from the signal from the second latch circuit, and an output signal control circuit for feeding a reset signal to the driving circuit and a clamp signal to the clamp circuit of the analog processing circuit once at each four periods of the signal output from the driving circuit.

In addition, the number of the latch circuit is not limited to two.

In FIG. 12, the output from the CCD driving circuit 60 is applied to the input of a buffer 78 through the capacitor 80. The input of the buffer 78 is connected to a 5-volt power supply through the transistor 81. The output VO of he buffer 78 is connected to an input of the analog-to-digital converter 72. The output D of the analog-to-digital converter 72 is connected to an input of the latch circuit 75. The output D1 of the latch circuit 75 is connected to an input of the latch circuit 76. The output D1 of the latch circuit 75 and the output D2 of the latch circuit 76 are connected to an input of a subtracter 77.

The control circuit 51 outputs various control clocks $\phi_T$, $\phi_1$, $\phi_2$, $\phi_R$, $T_{CLAMP}$, and $T_{AD}$. These clocks $\phi_T'$, $\phi_1$, $\phi_2$, $\phi_R$ are fed to the transistor 81. The clock $T_{CLAMP}$ is fed to the transistor 81. The clock $T_{AD}$ is fed to the analog-to-digital converter 72. An inverter 90 receives the clamp signal $T_{CLAMP}$. The output of the inverter 90 is connected to the latches 75 and 76. An inverter 91 receives the AD driving signal $T_{AD}$. The output of the inverter 91 is connected to the latches 75 and 76.

Figure 13:
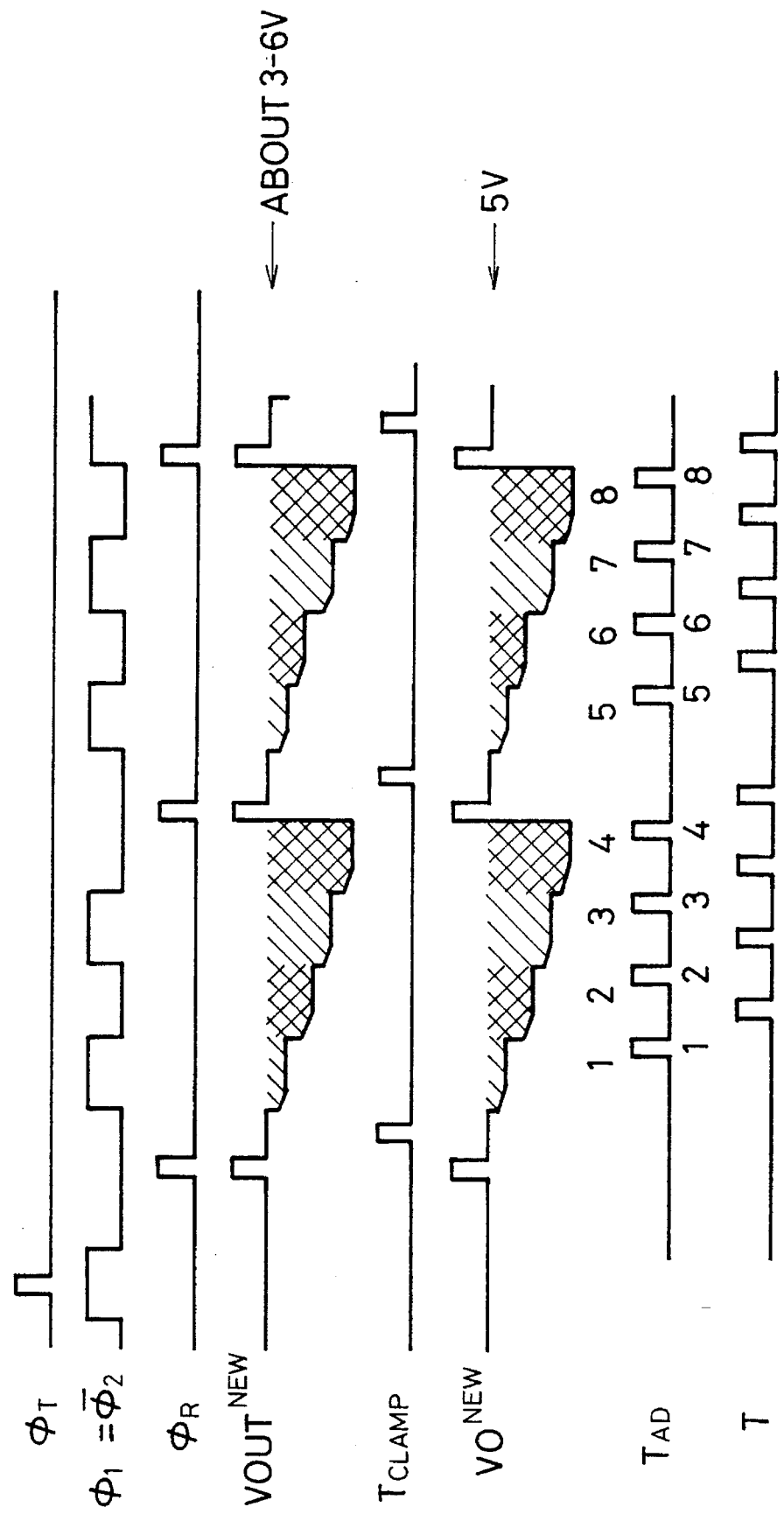
FIGS. 13 to 14 are charts showing timings of the circuit shown in FIG. 12.

Next, the description will be oriented to the operation of this embodiment shown in FIG. 13. FIG. 13 shows timings for the driving signals $\phi_T$, $\phi_1$ and $\phi_R$ to be sent to the CCD sensor, a CCD output $VOUT^{NEW}$, a clamp signal $T_{CLAMP}$, a buffer output $VO^{NEW}$, an analog-to-digital driving signal $T_{AD}$, and a clock T on which DOUT is to be read. In this embodiment, the reset signal $\phi_R$ and the clamp signal $T_{CLAMP}$ are fed once at each four periods of the CCD output. The output $VOUT^{NEW}$ of the CCD sensor is clamped to 5 volts through the effect of a capacitor and a transistor. The clamped signal is amplified by a buffer and is outputted as the signal $VO^{NEW}$.

In this embodiment, the relation between the buffer output $VO^{NEW}$ given when the reset signal $\phi_R$ and the clamp signal $T_{CLAMP}$ are fed once at each four periods of the CCD output and the buffer output VO given when the reset signal $\phi_R$ and the clamp signal $T_{CLAMP}$ are fed at each period of the CCD output (the prior art) will be described below. N buffer outputs VONEW are named as VOLNEW (L=1, 2, ..., N). N buffer outputs VO are named as VOL (L=1, 2, ..., N). The quantity of light is controlled to be a quarter of that of the scanner according to the prior art.

$VO1^{NEW}=¼ VO1$ $VO2^{NEW}=¼ (VO1+VO2)$ $VO3^{NEW}=¼ (VO1+VO2+VO3)$ $VO4^{NEW}=¼ (VO1+VO2+VO3+VO4)$ $VO5^{NEW}=¼ VO5$

Unless the reset pulse is added to the CCD, the outputs are sequentially added to each other as described above.

In this embodiment, therefore, the output $VO_{NEW}$ of the buffer is converted into a digital signal through the analog-to-digital converter 72 and then fed to the latch circuits 75 and 76. The latch circuits 75 and 76 are reset by a reversed signal of $T_{CLAMP}$ so that these latch circuits may latch the output D from the analog-to-digital converter 72 and the output D1 from the latch circuit 75 at the leading edge of the reversed signal of $T_{AD}$. The output from the latch circuit 76 is D2.

The outputs D1 and D2 from the two latch circuits 75 and 76 are fed to the subtracter 77. The output DOUT of the subtracter 77 is D1–D2, where the latch circuits 75 and 76 are both reset immediately after the signal of $T_{CLAMP}$. Hence, only at the start of the four periods, D1–0=D1 is established.

Hence, the scanner according to this embodiment outputs to the host computer the signal DOUT in which;

the first output is $VO1^{NEW}$, the second output is $VO2^{NEW}-VO1^{NEW}$ the third output is $VO3^{NEW}-VO2^{NEW}$ the fourth output is $VO4^{NEW}-VO3^{NEW}$ the fifth output is $VO5^{NEW}$.

That is,

The first output is ¼ VO1.

The second output is ¼ VO2.

The third output is ¼ VO3.

The fourth output is ¼ VO4.

The fifth output is ¼ VO5.

In this case, the signal DOUT of this embodiment is reduced to a quarter of that of the prior art. To cope with this, the host system may make it fourfold. In place, the scanner may make it fourfold before output.

In this embodiment, the reset signal and the clamp signal are outputted once at each four periods of the CCD output. However, these signals may be outputted once at each of any period of the CCD output.

Figure 14:
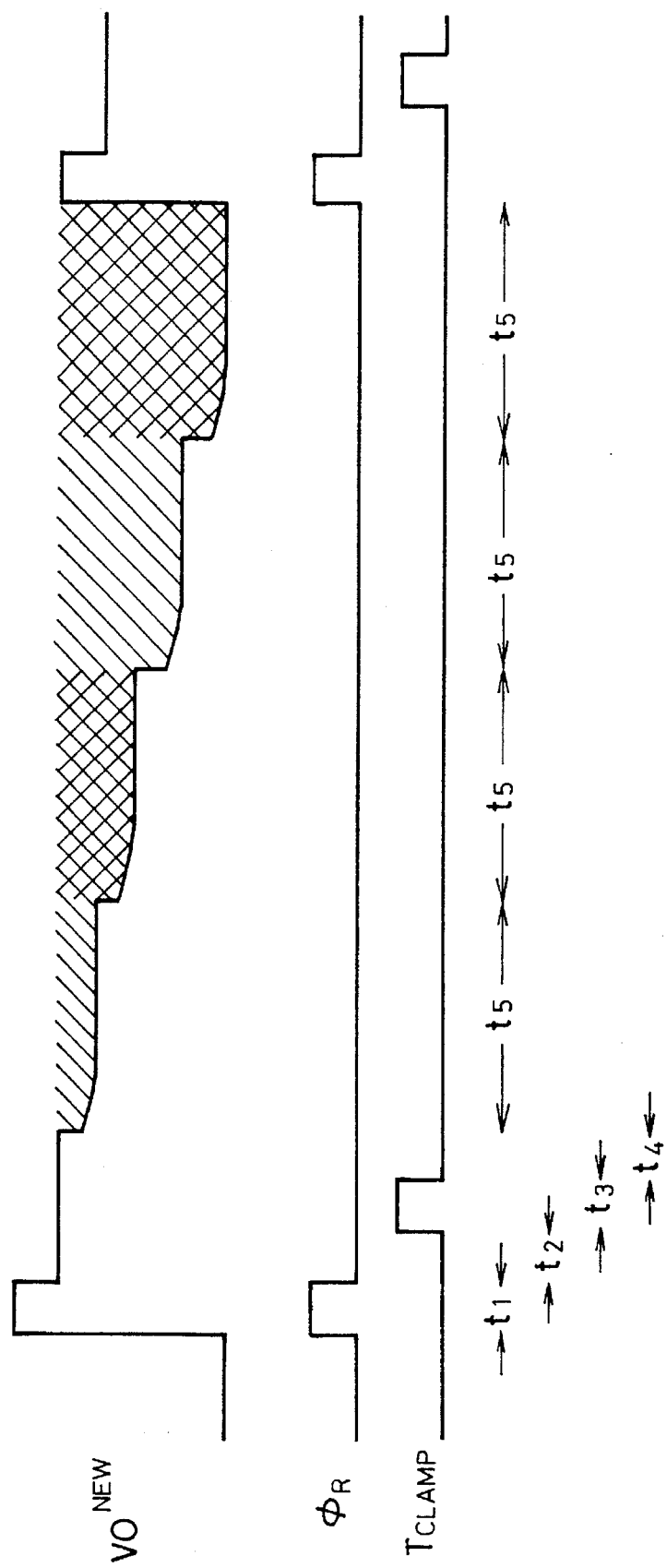

This embodiment offers an advantage that the time width of the four periods of VO is as small as 1 μsec as shown in FIG. 14. In the case of the scanner according to the prior art, it needs 400 nsec×4=1.6 μsec. According to this invention, therefore, a scan time is made ¹⁄₁.₆ time as large as the scan time needed by the prior art.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image scanning device comprising:

a light source for emitting a beam;

a CCD circuit board having a CCD sensor;

an optical unit for guiding said emitted beam from said light source to said CCD sensor;

a CCD sensor driving circuit connected with said CCD circuit board with a signal cable;

a clock generating circuit for generating a clock to be transferred to said CCD sensor;

a reset pulse generating circuit for generating a reset pulse for resetting an output buffer of said CCD sensor;

a clamp circuit for clamping an output of said CCD sensor;

an analog-to-digital converter for converting an analog signal into a digital signal;

an actuating means for actuating said reset pulse generating circuit and said clamp circuit one time for a plurality of outputs of said CCD sensor;

a first latch means for latching an output of said analog-to-digital converter;

a second latch means for latching an output of said first latch means; and a subtracting means for subtracting said output of said second latch means from said output of said first latch means.

2. An image scanning device according to claim 1, wherein said actuating means is adapted to actuate said reset pulse generating circuit and said clamp circuit one time for four times of outputs of said CCD sensor.

* * * * *